US010261318B2

(12) United States Patent
TeKolste et al.

(10) Patent No.: US 10,261,318 B2
(45) Date of Patent: Apr. 16, 2019

(54) ARCHITECTURES AND METHODS FOR OUTPUTTING DIFFERENT WAVELENGTH LIGHT OUT OF WAVEGUIDES

(71) Applicant: Magic Leap, Inc., Dania Beach, FL (US)

(72) Inventors: Robert Dale TeKolste, Ft. Lauderdale, FL (US); Michael Anthony Klug, Austin, TX (US); Brian T. Schowengerdt, Seattle, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 14/869,537

(22) Filed: Sep. 29, 2015

(65) Prior Publication Data
US 2016/0116739 A1 Apr. 28, 2016

Related U.S. Application Data

(60) Provisional application No. 62/057,165, filed on Sep. 29, 2014.

(51) Int. Cl.
*G02B 6/00* (2006.01)
*G02B 27/01* (2006.01)
(Continued)

(52) U.S. Cl.
CPC ......... *G02B 27/0172* (2013.01); *G02B 6/005* (2013.01); *G02B 6/0025* (2013.01);
(Continued)

(58) Field of Classification Search
CPC ...................................................... G02B 6/00
(Continued)

(56) References Cited

U.S. PATENT DOCUMENTS 4,693,544 A * 9/1987 Yamasaki .......... G02B 6/29364
385/132
5,915,051 A * 6/1999 Damask ............. G02B 6/12007
385/14

(Continued)

FOREIGN PATENT DOCUMENTS

CN 101133348 B 9/2010
CN 102683803 9/2012
(Continued)

OTHER PUBLICATIONS

International Search Report and Written Opinion for Application No. PCT/US15/53016 dated Dec. 30, 2015.
(Continued)

*Primary Examiner* — Kaveh C Kianni
(74) *Attorney, Agent, or Firm* — Knobbe, Martens, Olson & Bear, LLP

(57) ABSTRACT

Architectures are provided for selectively outputting light for forming images, the light having different wavelengths and being outputted with low levels of crosstalk. In some embodiments, light is incoupled into a waveguide and deflected to propagate in different directions, depending on wavelength. The incoupled light then outcoupled by outcoupling optical elements that outcouple light based on the direction of propagation of the light. In some other embodiments, color filters are between a waveguide and outcoupling elements. The color filters limit the wavelengths of light that interact with and are outcoupled by the outcoupling elements. In yet other embodiments, a different waveguide is provided for each range of wavelengths to be outputted. Incoupling optical elements selectively incouple light of the appropriate range of wavelengths into a corresponding waveguide, from which the light is outcoupled.

22 Claims, 13 Drawing Sheets

(51) Int. Cl.
  *F21V 8/00* (2006.01)
  *G02B 27/42* (2006.01)
  *G02B 27/00* (2006.01)

(52) U.S. Cl.
  CPC ......... *G02B 6/0026* (2013.01); *G02B 6/0076* (2013.01); *G02B 27/0081* (2013.01); *G02B 27/4205* (2013.01); *G02B 2027/014* (2013.01); *G02B 2027/0112* (2013.01); *G02B 2027/0114* (2013.01); *G02B 2027/0127* (2013.01); *G02B 2027/0134* (2013.01); *G02B 2027/0174* (2013.01); *G02B 2027/0194* (2013.01)

(58) Field of Classification Search
  USPC .......................................................... 385/36
  See application file for complete search history.

(56) References Cited

U.S. PATENT DOCUMENTS

| | | | |
|---|---|---|---|
| 6,181,393 B1 | 1/2001 | Enomoto et al. | |
| 6,334,960 B1 | 1/2002 | Willson et al. | |
| 6,542,671 B1* | 4/2003 | Ma | G02B 6/12002 385/132 |
| 6,690,845 B1* | 2/2004 | Yoshimura | G02B 6/12002 257/E23.01 |
| 6,735,224 B2* | 5/2004 | Murry | G02B 6/12007 372/20 |
| 6,850,221 B1 | 2/2005 | Tickle | |
| 6,873,087 B1 | 3/2005 | Choi et al. | |
| 6,900,881 B2 | 5/2005 | Sreenivasan et al. | |
| D514,570 S | 2/2006 | Ohta | |
| 7,023,466 B2 | 4/2006 | Favalora et al. | |
| 7,070,405 B2 | 7/2006 | Sreenivasan et al. | |
| 7,098,572 B2 | 8/2006 | Choi et al. | |
| 7,122,482 B2 | 10/2006 | Xu et al. | |
| 7,140,861 B2 | 11/2006 | Watts et al. | |
| 7,519,096 B2* | 4/2009 | Bouma | A61B 5/0059 372/102 |
| 7,692,759 B2 | 4/2010 | Escuti et al. | |
| 8,064,035 B2 | 11/2011 | Escuti et al. | |
| 8,076,386 B2 | 12/2011 | Xu et al. | |
| 8,233,204 B1 | 7/2012 | Robbins et al. | |
| 8,264,623 B2 | 9/2012 | Marrucci | |
| 8,508,848 B2 | 8/2013 | Saarikko | |
| 8,757,812 B2 | 6/2014 | Melville et al. | |
| 8,885,997 B2 | 11/2014 | Nguyen et al. | |
| 8,950,867 B2 | 2/2015 | Macnamara | |
| 9,081,426 B2 | 7/2015 | Armstrong | |
| 9,215,293 B2 | 12/2015 | Miller | |
| D752,529 S | 3/2016 | Loretan et al. | |
| 9,310,559 B2 | 4/2016 | Macnamara | |
| 9,348,143 B2 | 5/2016 | Gao et al. | |
| D758,367 S | 6/2016 | Natsume | |
| D759,657 S | 7/2016 | Kujawski et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| D794,288 S | 8/2017 | Beers et al. | |
| 9,740,006 B2 | 8/2017 | Gao | |
| 9,791,700 B2 | 10/2017 | Schowengerdt et al. | |
| D805,734 S | 12/2017 | Fisher et al. | |
| 9,851,563 B2 | 12/2017 | Gao et al. | |
| 9,857,591 B2 | 1/2018 | Welch et al. | |
| 2002/0097962 A1* | 7/2002 | Yoshimura | G02B 6/10 385/50 |
| 2002/0126249 A1 | 9/2002 | Liang et al. | |
| 2002/0167638 A1 | 11/2002 | Byun et al. | |
| 2002/0172237 A1* | 11/2002 | Murry | H01S 3/094003 372/6 |
| 2003/0161573 A1* | 8/2003 | Ishida | G02B 6/12002 385/14 |
| 2004/0007465 A1* | 1/2004 | Goldberg | G01N 27/44704 204/452 |
| 2004/0022888 A1 | 2/2004 | Sreenivasan et al. | |
| 2004/0120647 A1 | 6/2004 | Sakata et al. | |
| 2004/0191429 A1 | 9/2004 | Patrick | |
| 2005/0042391 A1 | 2/2005 | Ryan et al. | |
| 2005/0072959 A1 | 4/2005 | Moia et al. | |
| 2005/0232530 A1 | 10/2005 | Kekas | |
| 2006/0121358 A1 | 6/2006 | Rich et al. | |
| 2006/0126179 A1 | 6/2006 | Levola | |
| 2006/0157443 A1 | 7/2006 | Mei | |
| 2007/0031097 A1* | 2/2007 | Heikenfeld | G02B 26/02 385/129 |
| 2009/0141216 A1 | 6/2009 | Marrucci | |
| 2010/0142570 A1 | 6/2010 | Konttinen et al. | |
| 2010/0207964 A1 | 8/2010 | Kimmel et al. | |
| 2011/0024950 A1 | 2/2011 | Kruglick | |
| 2011/0049761 A1 | 3/2011 | Mataki | |
| 2012/0127062 A1 | 5/2012 | Bar-Zeev et al. | |
| 2012/0162549 A1 | 6/2012 | Gao et al. | |
| 2012/0206485 A1* | 8/2012 | Osterhout | G02B 27/0093 345/633 |
| 2012/0218301 A1* | 8/2012 | Miller | G02B 27/017 345/633 |
| 2012/0327330 A1 | 12/2012 | Takahashi et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0222384 A1 | 8/2013 | Futterer | |
| 2013/0235440 A1 | 9/2013 | Takeda et al. | |
| 2013/0242392 A1 | 9/2013 | Amirparviz et al. | |
| 2013/0314765 A1 | 11/2013 | Padilla et al. | |
| 2014/0064655 A1 | 3/2014 | Nguyen et al. | |
| 2014/0071539 A1 | 3/2014 | Gao | |
| 2014/0140653 A1 | 5/2014 | Brown et al. | |
| 2014/0140654 A1 | 5/2014 | Brown et al. | |
| 2014/0177023 A1 | 6/2014 | Gao et al. | |
| 2014/0211322 A1* | 7/2014 | Bohn | G02B 27/0081 359/633 |
| 2014/0218468 A1 | 8/2014 | Gao et al. | |
| 2014/0233879 A1* | 8/2014 | Gibson | G02B 6/0003 385/4 |
| 2014/0306866 A1 | 10/2014 | Miller et al. | |
| 2015/0015879 A1* | 1/2015 | Papadopoulos | G02B 23/26 356/301 |
| 2015/0016777 A1 | 1/2015 | Abovitz et al. | |
| 2015/0062500 A1 | 3/2015 | Park et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0033771 A1* | 2/2016 | Tremblay | G02B 27/0172 345/8 |
| 2016/0041390 A1* | 2/2016 | Poon | G02B 3/04 345/8 |
| 2016/0077338 A1* | 3/2016 | Robbins | G02B 27/0172 345/8 |
| 2016/0097930 A1* | 4/2016 | Robbins | G02B 27/0172 345/8 |
| 2016/0116739 A1 | 4/2016 | TeKolste et al. | |
| 2016/0116979 A1* | 4/2016 | Border | G06F 3/013 345/156 |
| 2016/0209648 A1* | 7/2016 | Haddick | G02B 27/0093 |
| 2016/0270656 A1 | 9/2016 | Samec et al. | |
| 2017/0010466 A1 | 1/2017 | Klug et al. | |
| 2017/0010488 A1 | 1/2017 | Klug et al. | |
| 2017/0322419 A1 | 11/2017 | TeKolste et al. | |

FOREIGN PATENT DOCUMENTS

| | | |
|---|---|---|
| CN | 104145208 | 11/2014 |
| EP | 3 201 686 | 8/2017 |
| WO | WO 2006/092758 | 9/2006 |

(56) References Cited

FOREIGN PATENT DOCUMENTS

| WO | WO 2010/067114 | 6/2010 |
|---|---|---|
| WO | WO 2014/091204 A1 | 6/2014 |
| WO | WO 2014/172252 | 10/2014 |
| WO | WO 2016/054092 | 4/2016 |
| WO | WO 2016/205249 | 12/2016 |
| WO | WO 2016/205256 | 12/2016 |

OTHER PUBLICATIONS

Taiwanese Office Action for TW Application No. 105118766, dated Feb. 21, 2018.
Escuti M.J. et al., "Polarization-Independent Switching With High Contrast From a Liquid Crystal Polarization Grating," SID Symposium Digest (Jun. 2006) 37:1443-1446.
Escuti M.J. et al., NC State University Slides, "Polarization-Independent LC Microdisplays Using Liquid Crystal Polarization Gratings: A Viable Solution", Presentation at ILCC Jul. 1, 2008 in 15 pages.
Kim, J. et al "Wide-angle, nonmechanical beam steering with high throughput utilizing polarization gratings", Applied Optics (Jun. 2011) 50(17):2636-2639.
Komanduri R.K. et al., "Elastic Continuum Analysis of the Liquid Crystal Polarization Grating", Physical Review E. (May 25, 2007) in 8 pages.
Komanduri R.K. et al., "Polarization-independent modulation for projection displays using small-period LC polarization gratings", J Soc Inform Display (2007) 15(8):589-594.
Komanduri R.K.et al., "Late-News Paper: Polarization Independent Liquid Crystal Microdisplays", SID Symposium Digest of Tech Papers (May 2008) 39(1):236-239.
Komanduri R.K. et al., NC State University Slides, "Polarization Independent Projection Systems using Thin Film Polymer Polarization Gratings and Standard Liquid Crystal Microdisplays", Presentation at SID-Display Week (Jun. 3, 2009) in 12 pages.
Komanduri R.K. et al., "34.4 L-Late-News Paper: Polarization Independent Projection Systems using Thin Film Polymer Polarization Gratings and Standard Liquid Crystal Microdisplays", In SID Symposium Digest of Technical Papers (Jun. 2009) in 4 pages.
Lim et al., "Anisotropic Nano-Imprinting Technique for Fabricating a Patterned Optical Film of a Liquid Cyrstalline Polymer", J Nanosci Nanotechnol. (2008) 8:4775-4778.
Nikolova et al., "Diffraction Efficiency and Selectivity of Polarization Holographic Recording", Optica Acta: Int'l J Optics (1984) 31(5):579-588.
Oh et al., "Numerical analysis of polarization gratings using the finite-difference time-domain method", Physical Review A (Oct. 2007) 76:043815-1 to -8.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C. et al., NC State University Slides, "Polarization-Independent Modulation", (2008) in 6 pages.
Oh et al., "Polarization-Independent Modulation Using Standard Liquid Crystal Microdisplays and Polymer Polarization Gratings," NC State University; International Display Research Conference, vol. 28, pp. 298-301, 2008. in 6 pages.
Yu, N. et al.,"Flat optics with designer metasurfaces", Review Article; Nature Materials, (Feb. 2014) 13: 139-150.
International Preliminary Report on Patentability for PCT Application No. PCT/US2015/053016, dated Apr. 13, 2017.
International Search Report and Written Opinion for PCT Application No. PCT/US2016/037452, dated Sep. 1, 2016.
Invitation to Pay Additional Fees for PCT Application No. PCT/US2016/037443, dated Aug. 5, 2016.
"Metamaterials". Duke University. Center for Metamaterials and Integrated Plasmonics. May 11, 2015 (Retrieved from the internet Aug. 12, 2016). URL:http://web.archive.org/web/20150511045547/http://metamaterials.duke.edu/research/metamaterials.
International Search Report and Written Opinion for PCT Application No. PCT/US2016/037443, dated Nov. 3, 2016.
U.S. Appl. No. 15/182,528, Display System With Optical Elements for In-Coupling Multiplexed Light Streams, filed Jun. 14, 2016.
U.S. Appl. No. 15/182,511, Virtual and Augmented Reality Systems and Methods, filed Jun. 14, 2016.
European Search Report for EP Application No. 15847759.6, dated Apr. 20, 2018.
First New Zealand Examination Report, re NZ Application No. 738362, dated Aug. 14, 2018.
First New Zealand Examination Report, re NZ Application No. 738352, dated Jun. 25, 2018.
New Zealand Office Action for NZ Application No. 730509, dated Mar. 9, 2018.
Office Action in U.S. Appl. No. 15/656,283 dated Jan. 3, 2018.
Response to Office Action dated Jan. 3, 2018 in U.S. Appl. No. 15/656,283 dated May 3, 2018.
Notice of Allowance in U.S. Appl. No. 15/656,283 dated Jul. 16, 2018.

* cited by examiner

ARCHITECTURES AND METHODS FOR OUTPUTTING DIFFERENT WAVELENGTH LIGHT OUT OF WAVEGUIDES

PRIORITY CLAIM

This application claims the priority benefit of U.S. Provisional Patent Application No. 62/057,165, filed on Sep. 29, 2014, entitled "VIRTUAL AND AUGMENTED REALITY SYSTEMS AND METHODS," the entirety of which is incorporated herein by reference.

INCORPORATION BY REFERENCE

This application incorporates by reference the entirety of each of the following patent applications: U.S. application Ser. No. 14/331,218; U.S. Provisional Application No. 62/012,273; and U.S. Provisional Application No. 62/005,807.

BACKGROUND

Field

The present disclosure relates to virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene 1 is depicted wherein a user of an AR technology sees a real-world park-like setting 1100 featuring people, trees, buildings in the background, and a concrete platform 1120. In addition to these items, the user of the AR technology also perceives that he "sees" a robot statue 1110 standing upon the real-world platform 1120, and a cartoon-like avatar character 1130 flying by which seems to be a personification of a bumble bee, even though these elements 1130, 1110 do not exist in the real world. Because the human visual perception system is complex, it is challenging to produce a VR or AR technology that facilitates a comfortable, natural-feeling, rich presentation of virtual image elements amongst other virtual or real-world imagery elements.

Systems and methods disclosed herein address various challenges related to VR and AR technology.

SUMMARY

Embodiment 1: An optical system comprising:
a waveguide comprising a first major surface and a second major surface, the waveguide configured to propagate light by total internal reflection between the first and the second major surfaces;
an incoupling optical element configured to incouple incident light into the waveguide at a first plurality of wavelengths along a first direction and incouple incident light into the waveguide at one or more second wavelengths along a second direction, wherein incoupled light of the first plurality of wavelengths propagate through the waveguide along the first direction by total internal reflection and incoupled light of the one or more second wavelengths propagate through the waveguide along the second direction by total internal reflection; and
first and second outcoupling optical elements configured to outcouple the incoupled light out of the waveguide.

Embodiment 2: The optical system of Embodiment 1, wherein the incoupling optical element includes one or more diffractive optical elements.

Embodiment 3: The optical system of Embodiment 2, wherein the one or more diffractive optical elements comprises one or more of an analog surface relief grating (ASR), a binary surface relief structure (BSR), a hologram, and a switchable diffractive optical element.

Embodiment 4: The optical system of Embodiment 3, wherein the switchable diffractive optical element is a switchable Polymer Dispersed Liquid Crystal (PDLC) grating.

Embodiment 5: The optical system of any of Embodiments 1-4, further comprising:
a first wavelength selective reflector configured to reflect incoupled light of the first plurality of wavelengths propagating along the first direction, while passing light of wavelengths other than the first plurality of wavelengths; and
a second wavelength selective reflector configured to reflect incoupled light of the one or more second wavelengths propagating along the second direction, while passing light of wavelengths other than the one or more second wavelengths.

Embodiment 6: The optical system of Embodiment 5, further comprising:
a first absorber configured to absorb incoupled light passing through the first wavelength selective reflector; and
a second absorber configured to absorb incoupled light passing through the second wavelength selective reflector.

Embodiment 7: The optical system of Embodiment 5, wherein the first and second wavelength selective reflectors are a dichroic filters.

Embodiment 8: The optical system of any of Embodiments 1-7, wherein the light at the first plurality of wavelengths includes red light and blue light.

Embodiment 9: The optical system of any of Embodiments 1-8, wherein the light of the one or more second wavelengths includes green light.

Embodiment 10: The optical system of any of Embodiments 1-9, further comprising:
first light distributing element configured to receive incoupled light of the first plurality of wavelengths traveling along the first direction and distribute the light of the first plurality of wavelengths to the first outcoupling optical elements; and
second light distributing element configured to receive incoupled light of the one or more second wavelengths traveling along the second direction and distribute the light in the second plurality of wavelengths to the second outcoupling optical elements.

Embodiment 11: The optical system of Embodiment 10, wherein the first and the second light distributing elements comprise one or more diffractive optical elements.

Embodiment 12: The optical system of Embodiment 11, wherein the one or more diffractive optical elements comprise one or more gratings.

Embodiment 13: The optical system of any of Embodiments 10-12, wherein the first light distributing element is configured to redirect light of the first plurality of wavelengths to propagate within the waveguide along a direction different from a direction in which the second light distributing element is configured to redirect light of the second plurality of wavelengths.

Embodiment 14: The optical system of any of Embodiments 10-13, wherein the first light distributing element is configured to redirect light of the first plurality of wavelengths to propagate within the waveguide along the second direction, and wherein the second light distributing element is configured to redirect light of the second plurality of wavelengths to propagate within the waveguide along the first direction.

Embodiment 15: The optical system of any of Embodiments 10-14, wherein the first and second light distributing elements are orthogonal pupil expanders.

Embodiment 16: The optical system of any of Embodiments 1-15, wherein the first outcoupling optical element comprises one or more gratings configured to outcouple light of the first plurality of wavelengths out of the waveguide; and wherein the second outcoupling optical element comprises one or more gratings configured to outcouple light of the one or more second wavelengths out of the waveguide.

Embodiment 17: The optical system of Embodiment 16, wherein the one or more gratings of the first outcoupling optical element are disposed on the first major surface of the waveguide and the one or more gratings of the second outcoupling optical element are disposed on the second major surface of the waveguide.

Embodiment 18: The optical system of Embodiment 16, wherein the one or more gratings of the first outcoupling optical element and the one or more gratings of the second outcoupling optical element are disposed on a same major surface of the waveguide.

Embodiment 19: The optical system of any of Embodiments 16-18, wherein the one or more gratings of the first outcoupling optical element comprises one or more of an analog surface relief grating (ASR), a binary surface relief structure (BSR), a hologram, and a switchable diffractive optical element.

Embodiment 20: The optical system of Embodiment 19, wherein the switchable diffractive optical element comprises a switchable Polymer Dispersed Liquid Crystal (PDLC) grating.

Embodiment 21: An optical system comprising:
a plurality of stacked waveguides, each waveguide comprising a first major surface and a second major surface, each waveguide configured to propagate light by total internal reflection between the first and the second major surfaces, each waveguide further comprising:
incoupling optical element configured to incouple incident light into the waveguide at a first plurality of wavelengths along a first direction and incouple incident light into the waveguide at one or more second wavelengths along a second direction; and
outcoupling optical element configured to outcouple the incoupled light out of the waveguide.

Embodiment 22: The optical system of Embodiment 21, wherein each waveguide has an associated depth plane, wherein each waveguide is configured to produce an image appearing to originate from that waveguide's associated depth plane.

Embodiment 23: The optical system of any of Embodiments 21-22, wherein different waveguides have different associated depth planes.

Embodiment 24: The optical system of any of Embodiments 21-23, wherein the outcoupling optical elements for different depth planes have different optical power so as to provide different divergence of exiting light for each depth plane.

Embodiment 25: An optical system comprising:
a waveguide comprising a first major surface and a second major surface;
an incoupling optical element configured to incouple incident light into the waveguide;
a first wavelength selective filter on the first major surface, the first wavelength selective filter having a first rearward surface adjacent the first major surface and a first forward surface opposite the first rearward surface, the first wavelength selective filter configured to:
transmit incoupled light at a first plurality of wavelengths through the first rearward surface of and reflect a portion of the transmitted light at the first plurality of wavelengths from the first forward surface; and
reflect incoupled light at other wavelengths; and
a first outcoupling optical element disposed on the first wavelength selective filter, the first outcoupling optical element configured to outcouple the incoupled light of the first plurality of wavelengths transmitted through the first wavelength selective filter.

Embodiment 26: The optical system of Embodiment 25, further comprising:
a second wavelength selective filter on the second major surface, the second wavelength selective filter having a second rearward surface adjacent the second major surface and a second forward surface opposite the second rearward surface, the first wavelength selective filter configured to:
transmit incoupled light at one or more second wavelengths different from the first plurality of wavelengths through the second rearward surface and reflect a portion of the transmitted light at the one or more second wavelengths from the second forward surface; and
reflect incoupled light at the first plurality of wavelengths; and
a second outcoupling optical element disposed on the second wavelength selective filter, the second outcoupling optical element configured to outcouple the incoupled light at one or more second wavelengths transmitted through the second wavelength selective filter.

Embodiment 27: The optical system of Embodiment 26, wherein the first and the second wavelength selective filters comprise dichroic filters.

Embodiment 28: The optical system of any of Embodiments 26-27, wherein the first and the second wavelength selective filters are configured to transmit light of the first plurality of wavelengths and the one or more second wavelengths incident at angles between 0 degrees and 20 degrees with respect to a normal to the corresponding first or the second major surface of the waveguide.

Embodiment 29: The optical system of any of Embodiments 26-28, wherein the light of the one or more second wavelengths includes green light.

Embodiment 30: The optical system of any of Embodiments 26-29, further comprising:
light distributing elements configured to:

receive incoupled light of the first plurality of wavelengths and the one or more second wavelengths from the incoupling optical element; and distribute the light of the first plurality of wavelengths and the one or more second wavelengths to the first and second outcoupling optical elements.

Embodiment 31: The optical system of Embodiment 30, wherein the light distributing elements comprise one or more diffractive optical elements.

Embodiment 32: The optical system of any of Embodiments 30-31, wherein the light distributing elements are orthogonal pupil expanders.

Embodiment 33: The optical system of any of Embodiments 30-32, wherein a first portion of light at the first plurality of wavelengths is reflected from the first forward surface of the first wavelength selective filter and a second portion of light at the first plurality of wavelengths is redirected by the light redistributing elements.

Embodiment 34: The optical system of Embodiment 33, wherein the first portion of light at the first plurality of wavelengths is incident on the first wavelength selective filter after being reflected from the second major surface, and wherein a portion of the first portion of light is redirected by the light redistributing elements.

Embodiment 35: The optical system of any of Embodiments 30-34, wherein a third portion of light at the one or more second wavelengths is reflected from the second forward surface of the second wavelength selective filter and a fourth portion of light at the one or more second wavelengths is redirected by the light redistributing elements.

Embodiment 36: The optical system of Embodiment 35, wherein the third portion of light at the one or more second wavelengths is incident on the second wavelength selective filter after being reflected from the first major surface, and wherein a portion of the third portion of light is redirected by the light redistributing elements.

Embodiment 37: The optical system of any of Embodiments 26-36, wherein:

the first outcoupling element comprises one or more diffractive optical elements; and the second outcoupling element comprises one or more diffractive optical elements.

Embodiment 38: The optical system of Embodiment 37, wherein the one or more diffractive optical elements of the first outcoupling optical element comprises one or more of an analog surface relief grating (ASR), a binary surface relief structure (BSR), a hologram, and a switchable diffractive optical element.

Embodiment 39: The optical system of Embodiment 38, wherein the switchable diffractive optical element comprises a switchable Polymer Dispersed Liquid Crystal (PDLC) grating.

Embodiment 40: The optical system of Embodiment 37, wherein the one or more gratings of the second outcoupling optical element comprises one or more of an analog surface relief grating (ASR), a binary surface relief structure (BSR), a hologram, and a switchable diffractive optical element.

Embodiment 41: The optical system of Embodiment 40, wherein the switchable diffractive optical element comprises a switchable Polymer Dispersed Liquid Crystal (PDLC) grating.

Embodiment 42: The optical system of any of Embodiments 25-41, wherein the incoupling optical element includes one or more diffractive optical elements.

Embodiment 43: The optical system of Embodiment 42, wherein the one or more diffractive optical elements comprises one or more of an analog surface relief grating (ASR), a binary surface relief structure (BSR), a hologram, and a switchable diffractive optical element.

Embodiment 44: The optical system of Embodiment 43, wherein the switchable diffractive optical element is a switchable Polymer Dispersed Liquid Crystal (PDLC) grating.

Embodiment 45: The optical system of any of Embodiments 25-44, wherein the incoupling optical element comprises a prism.

Embodiment 46: The optical system of any of Embodiments 25-46, wherein the light of the first plurality of wavelengths includes red light and blue light.

Embodiment 47: A optical system comprising:

a plurality of stacked waveguides, each waveguide comprising a first major surface and a second major surface, each waveguide further comprising:

an incoupling optical element configured to incouple incident light into the waveguide;

a first wavelength selective filter on the first major surface, the first wavelength selective filter having a first rearward surface adjacent the first major surface and a first forward surface opposite the first rearward surface, the first wavelength selective filter configured to:

transmit incoupled light at a first plurality of wavelengths through the first rearward surface of and reflect a portion of the transmitted light at the first plurality of wavelengths from the first forward surface; and a first outcoupling optical element disposed on the first wavelength selective filter, the first outcoupling optical element configured to outcouple the incoupled light of the first plurality of wavelengths transmitted through the first wavelength selective filter.

Embodiment 48: The optical system of Embodiment 47, wherein each waveguide further comprises:

a second wavelength selective filter on the second major surface, the second wavelength selective filter having a second rearward surface adjacent the second major surface and a second forward surface opposite the second rearward surface, the first wavelength selective filter configured to:

transmit incoupled light at one or more second wavelengths different from the first plurality of wavelengths through the second rearward surface and reflect a portion of the transmitted light at the one or more second wavelengths from the second forward surface; and a second outcoupling optical element disposed on the second wavelength selective filter, the second outcoupling optical element configured to outcouple the incoupled light at one or more second wavelengths transmitted through the second wavelength selective filter.

Embodiment 49: The optical system of any of Embodiments 47-48, wherein each waveguide has an associated depth plane, wherein each waveguide is configured to produce an image appearing to originate from that waveguide's associated depth plane.

Embodiment 50: The optical system of any of Embodiments 47-49, wherein different waveguides have different associated depth planes.

Embodiment 51: The optical system of any of Embodiments 47-50, wherein the outcoupling optical elements for different depth planes have different optical power so as to provide different divergence of exiting light for each depth plane.

Embodiment 52: The optical system of any of Embodiments 48-51, wherein each waveguide further comprises a light redistributing element configured to:
  receive a portion of light at the first plurality of wavelengths and the one or more second wavelengths transmitted through the first and the second wavelength selective filters; and
  distribute the light of the first plurality of wavelengths and the one or more second wavelengths to the first and second outcoupling optical elements.

Embodiment 53: An optical system comprising:
  a plurality of stacked waveguides, each waveguide comprising:
    an incoupling optical element configured to selectively incouple incident light into the waveguide based upon a property of the incident light;
    an outcoupling optical element configured to outcouple the light incoupled into the waveguide.

Embodiment 54: The optical system of Embodiment 53, wherein the property of the incident light is wavelength.

Embodiment 55: The optical system of any of Embodiments 53-54, wherein the incoupling optical element is a wavelength selective reflector.

Embodiment 56: The optical system of Embodiment 55, wherein the wavelength selective reflector is a dichroic reflector.

Embodiment 57: The optical system of any of Embodiments 55-56, wherein each waveguide comprises a wavelength selective reflector configured to reflect light of a different range of wavelengths than the wavelength selective reflector of another waveguide of the plurality of stacked waveguides.

Embodiment 58: The optical system of any of Embodiments 55-57, wherein each wavelength selective reflector is configured to reflect light of a range of wavelengths corresponding to a different color than the wavelength selective reflector of other waveguides of the plurality of stacked waveguides.

Embodiment 59: The optical system of any of Embodiments 53-58, wherein the plurality of stacked waveguides comprises three waveguides, including a first waveguide configured to output red light, a second waveguide configured to output green light, and a third waveguide configured to output blue light.

Embodiment 60: The optical system of any of Embodiments 53-59, wherein the outcoupling optical element is a diffractive optical element.

Embodiment 61: The optical system of Embodiment 60, wherein the diffractive optical element comprises one or more of an analog surface relief gratings (ASR), a binary surface relief structures (BSR), a hologram, and a switchable diffractive optical element.

Embodiment 62: The optical system of Embodiment 61, wherein the switchable diffractive optical element comprises a switchable Polymer Dispersed Liquid Crystal (PDLC) grating.

Embodiment 63: The optical system of any of Embodiments 53-62, wherein each waveguide further comprises an angle-modifying optical element configured to modify an angle of propagation of the incident light, such that the incident light propagates at a shallower angle to the waveguide surface after impinging on the angle-modifying optical element.

Embodiment 64: The optical system of Embodiment 63, wherein the angle-modifying element is configured to change focus of the incident light.

Embodiment 65: The optical system of Embodiment 63, wherein the angle-modifying optical element is a prism.

Embodiment 66: The optical system of Embodiment 63, wherein the angle-modifying optical element is a diffractive optical element.

Embodiment 67: The optical system of any of Embodiments 53-66, wherein each waveguide further comprises a light distributing element, wherein the incoupling optical element is configured to direct light to the light distributing element, wherein the light distributing element is configured to direct light to the outcoupling optical element.

Embodiment 68: The optical system of Embodiment 67, wherein the light distributing element is an orthogonal pupil expander.

Embodiment 69: The optical system of any of Embodiments 67-68, wherein the light distributing element, the incoupling optical element, and the outcoupling optical element are disposed on a surface of the waveguide.

Embodiment 70: The optical system of any of Embodiments 67-69, wherein the light distributing elements comprise one or more of analog surface relief gratings (ASR), binary surface relief structures (BSR), a hologram, and a switchable diffractive optical element.

Embodiment 71: The optical system of Embodiment 70, wherein the switchable diffractive optical element comprises a switchable Polymer Dispersed Liquid Crystal (PDLC) grating.

Embodiment 72: An optical system comprising:
  multiple sets of stacked waveguides, each set comprising
    a plurality of stacked waveguides, each waveguide comprising:
    an incoupling optical element configured to selectively incouple incident light into the waveguide based upon a property of the incident light; and
    an outcoupling optical element configured to outcouple the light incoupled into the waveguide.

Embodiment 73: The optical system of Embodiment 72, wherein each waveguide has an associated depth plane, wherein each waveguide is configured to produce an image appearing to originate from that waveguide's associated depth plane, and wherein waveguides of different sets of waveguides have different associated depth planes.

Embodiment 74: The optical system of any of Embodiments 73-73, wherein waveguides of each set of stacked waveguides have the same associated depth plane.

Embodiment 75: The optical system of any of Embodiments 72-74, wherein the outcoupling optical elements have optical power so as to provide a diverging light beam.

Embodiment 76: The optical system of any of Embodiments 72-75, wherein the outcoupling optical elements for different depth planes have different optical power so as to provide different divergence of exiting light for each depth plane.

BRIEF DESCRIPTION OF THE DRAWINGS

The drawings are provided to illustrate certain example embodiments and are not intended to limit the scope of the disclosure. Like numerals refer to like parts throughout.

DETAILED DESCRIPTION

Figure 1:
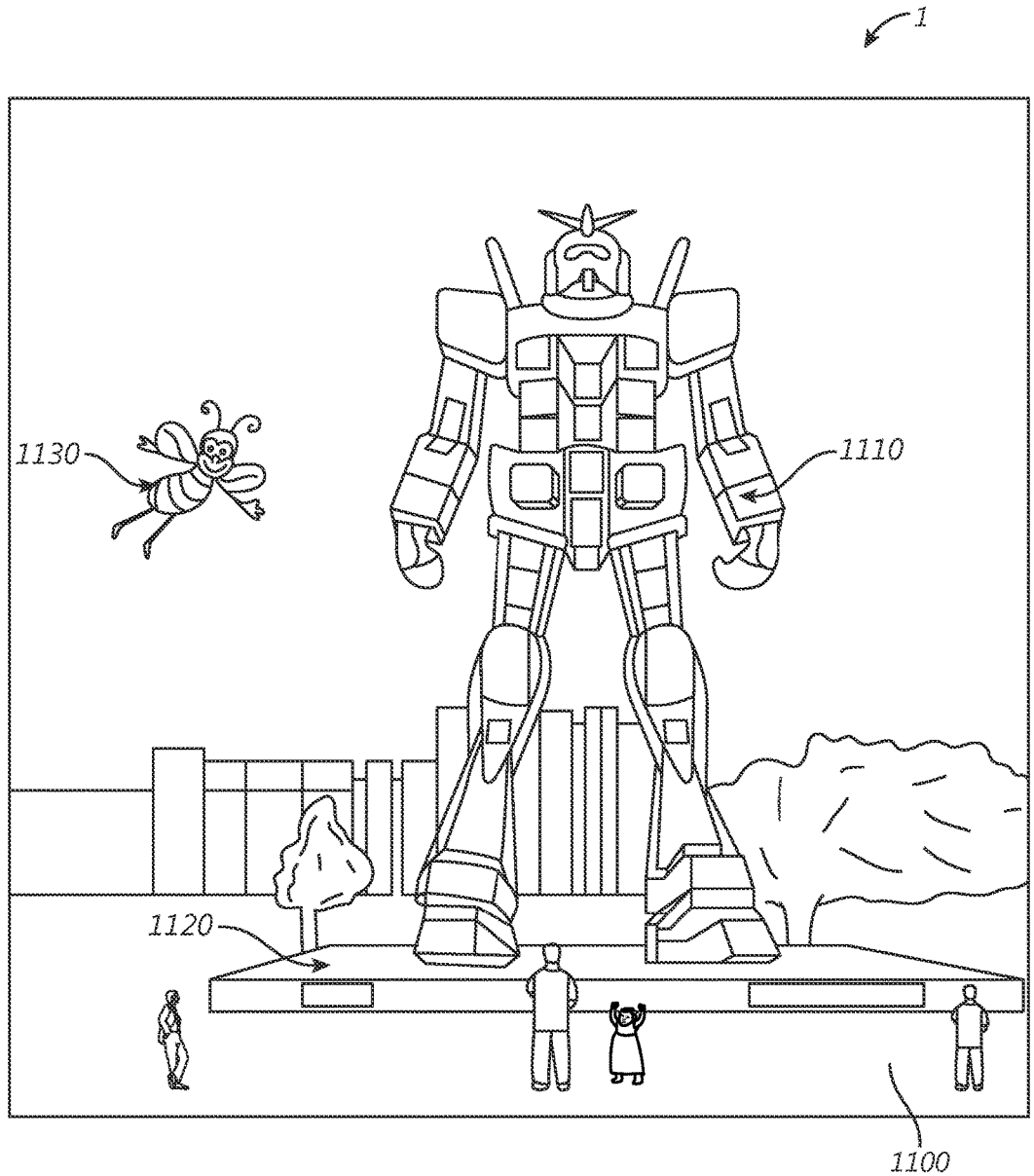
FIG. 1 illustrates a user's view of augmented reality (AR) through an AR device.

VR and AR experiences can be provided by display systems having displays in which images corresponding to a plurality of depth planes are provided to a viewer. The images may be different for each depth plane (e.g. provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed herein, such depth cues provide credible perceptions of depth.

In some configurations, a full color image may be formed for the various depth planes by overlaying component images that each have a particular component color. For example, red, green, and blue images may each be outputted to form each full color image. As a result, each depth plane may have multiple component color images associated with it. As disclosed herein, the component color images may be outputted using waveguides that incouple light containing image information, distribute the incoupled light across the waveguides, and then outcouple light towards a viewer.

Light may be incoupled to the waveguide using incoupling optical elements, such as diffractive elements, and then outcoupled out of the waveguide using outcoupling optical elements, which may also be diffractive elements. Conventionally, a pair of incoupling and outcoupling optical elements may be used. Such an arrangement, however, can degrade image quality. For example, such optical elements typically most efficiently deflect a particular design wavelength and, undesirably, a full color image formed by red, green, and blue component images fed through such a system may exhibit significant cropping and mis-focusing depending on wavelength (e.g., cropping and mis-focusing may occur for non-design wavelength channels). In addition, crosstalk, or ghosting may be caused by such the incoupling and outcoupling optical elements. In some cases, a diffractive optical element optimized for one wavelength can cause ghost-like images to be formed when impinged upon by light of other wavelengths. For example, a diffractive optical element that is designed to place a green image on a depth plane 1 meter from the viewer may place blue and red images on depth planes closer or farther than a meter. This crosstalk between depth planes can undermine the viewer's perception of depth and reduce image clarity.

In addition, color balance may be adversely impacted by the tendency of incoupling and outcoupling optical elements such as diffractive optical elements to deflect some amount of light even at wavelengths that the optical elements are not specifically designed to deflect. Because a full color image is formed using multiple component color images, color accuracy in the full color image and the range of colors that are available may be dependent on the ability to precisely regulate the amount of light of the component colors that reaches the viewer. Crosstalk between the different component color images may be undesirable. For example, a full color image may be formed using component red, green, and blue images. A red component color image, formed using red-colored light, that also includes unintended green light or blue light is undesirable for, among other things, undermining the ability to precisely regulate the amount of green or blue light that makes up the final full color image. This can reduce the color accuracy of the full color image and also reduce the range of colors that are generated, since the ability to precisely and finely regulate proportions of the different colors of light is diminished by the crosstalk. Stated another way, the full color image may be of a higher quality when the component color images are each formed with light of a "pure" component color, rather than a "dirty" component color that include a range of other unintended colors.

Advantageously, various embodiments disclosed herein provide low levels of cross-talk and unintended outcoupling behavior.

In some embodiments, various architectures are provided for selectively outputting light of different wavelengths with low levels of crosstalk. In some embodiments, light is incoupled into a waveguide and deflected to propagate in different directions, depending on wavelength. The incoupled light is then outcoupled by one or more outcoupling optical elements that selectively outcouple light based on the direction of propagation of the light. In some embodiments, color filters are provided between a waveguide and the one or more outcoupling elements on the surface of the waveguide. The color filters limit the wavelengths of light that interact with and are outcoupled by the one or more outcoupling elements. In yet other embodiments, a different waveguide is provided for each range of wavelengths or colors to be outputted. One or more incoupling optical elements selectively incouple light of the appropriate range of wavelengths into a corresponding waveguide, from which the light is outcoupled.

In these various embodiments, as described herein, the waveguides may form direct view display devices or near-eye display devices, with the waveguides configured to receive input image information and generate an output image based on the input image information. These devices may be wearable and constitute eyewear. The input image information received by the waveguides can be encoded in multiplexed light streams of different wavelengths (e.g., red, green and blue light) which are incoupled into one or more waveguides. The incoupled light can be outcoupled (or outputted) from the waveguide by one or more outcoupling optical elements. The one or more outcoupling optical elements can include diffractive structures, such as, for example, an analog surface relief grating (ASR), binary surface relief structures (BSR), Volume Holographic Optical Elements (VHOE), Digital Surface Relief structures and/or volume phase holographic material (e.g., holograms recorded in volume phase holographic material), or a switchable diffractive optical element (e.g., Polymer Dispersed Liquid Crystal (PDLC) grating). It will be appreciated that analog surface relief grating can combine multiple functions in a single structure. These structures may additively build functionality (e.g., one functionality may be a selectively for deflecting light of a particular wavelength or range of wavelengths, and another functionality may be a selectivity for deflecting light of another wavelength or range of wavelengths) through successive fabrication steps (e.g., in which a structure with one functionality is built on top of a structure with another functionality).

Various embodiments described herein can include one or more gratings (e.g., linear grooves) that are configured such that light propagating along a direction substantially parallel to the grating is not sufficiently deflected from its path such that it is coupled out of the waveguide. In contrast, light propagating along a direction that is at an angle with respect to the grating (e.g., perpendicular to the grooves), such that it impinges or strikes the grating, is diffracted at angles that do not satisfy the requirement for total internal reflection (TIR) and are thus coupled out of the waveguide. In some embodiments, the waveguide includes one or more incoupling optical elements that can redirect light at different directions that are compatible with the orientation of the corresponding diffractive structures.

Various embodiments described herein can include optical filters that transmit specific wavelengths of light. The filters can limit the wavelengths of light that interact with or impinge on the one or more outcoupling optical elements, thereby reducing the likelihood of the outcoupling of light of unintended wavelengths.

It will be appreciated that embodiments disclosed herein may provide one or more of the following advantages. For example, as noted herein, the outcoupling of light of unintended wavelengths may be reduced, thereby reducing the occurrence of ghosting, as discussed above. This reduction or elimination of ghosting can improve image clarity. In addition, the reduction in the outcoupling of light if unintended wavelengths can increase the perceived color quality of images formed using the light. In some embodiments, the ability to specifically outcouple a desired wavelength or range of wavelengths of light can provide images with a high degree of color accuracy and precision. In addition, the range of colors that may be displayed may be increased, since a high degree of control over the outcoupling of individual wavelengths of light may provide a high degree of control over the ultimate proportions of particular wavelengths of light in a final full color image. The ability to precisely control proportions of different wavelengths of light can increase the number of repeatable combination of component colors possible, thereby increasing the number of colors (from mixtures of the component colors) that may be displayed. In some embodiments, multiple wavelengths or colors of light may be outcoupled from the same waveguide, which can have advantages for improving manufacturability and yield and reducing device costs by, for example, reducing the number of parts utilized in a display system, thereby reducing the structural and electrical complexity of the display system.

Embodiments disclosed herein may be implemented as display systems generally. In some embodiments, the display systems take the form of eyewear (e.g., they are wearable), which may advantageously provide a more immersive VR or AR experience. For example, displays containing waveguides for displaying multiple depth planes, e.g. a stack of waveguides (one waveguide or set of waveguides for each depth plane), may be configured to be worn positioned in front of the eyes of a user, or viewer. In some embodiments, multiple waveguides, e.g. two stacks of waveguides, one for each eye of a viewer, may be utilized to provide different images to each eye.

Figure 2:
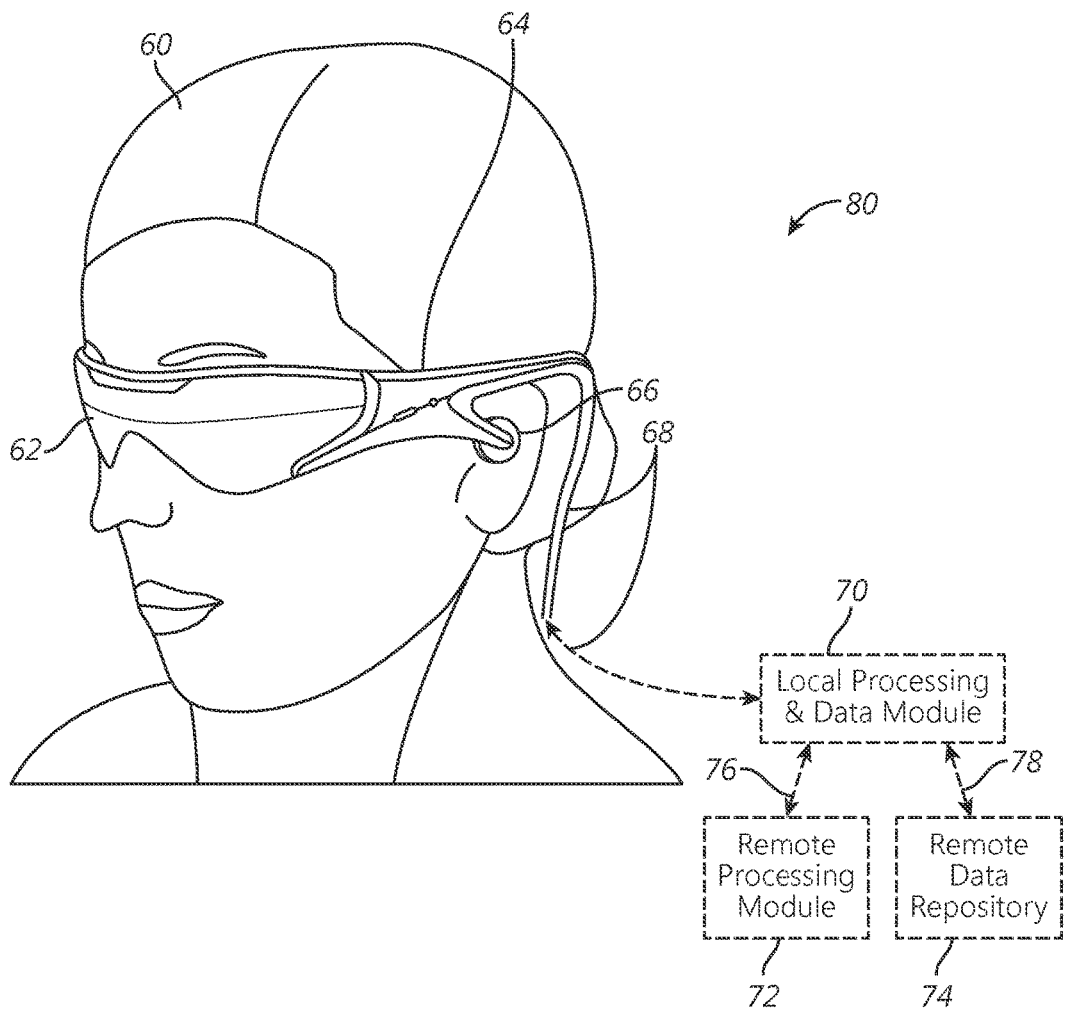
FIG. 2 illustrates an example of wearable display system.

FIG. 2 illustrates an example of wearable display system 80. The display system 80 includes a display 62, and various mechanical and electronic modules and systems to support the functioning of that display 62. The display 62 constitutes eyewear and may be coupled to a frame 64, which is wearable by a display system user or viewer 60 and which is configured to position the display 62 in front of the eyes of the user 60. In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems).

With continued reference to FIG. 2, the display 62 is operatively coupled 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise a hardware processor, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. In some embodiments, the location processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be stand alone structures that communicate with the location processing and data module 70 by wired or wireless communication pathways.

With continued reference to FIG. 2, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

Figure 3:
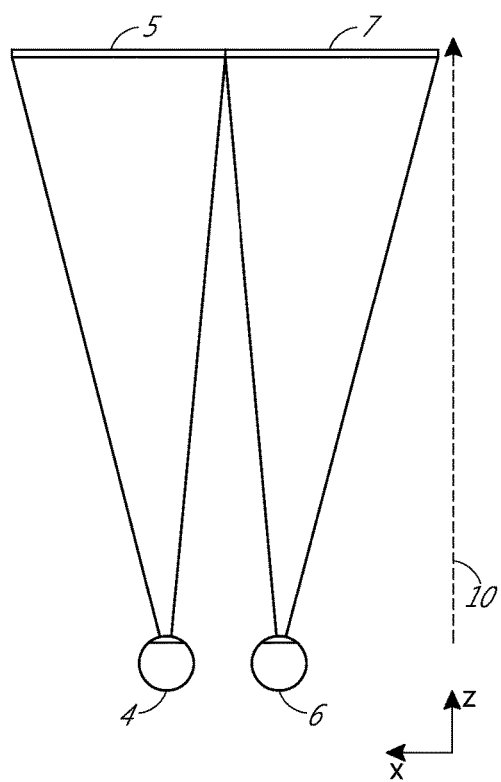
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
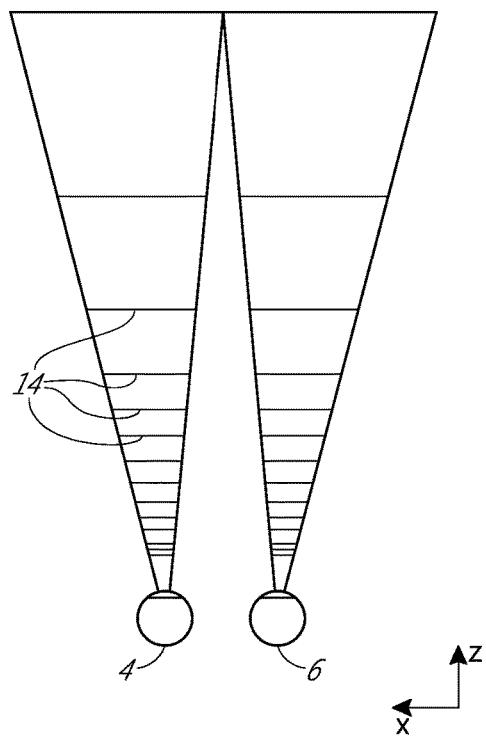
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4, objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. Additionally, while shown as flat for ease of illustration, it will be appreciated that the contours of a depth plane may be curved in physical space, such that all features in a depth plane are in focus with the eye in a particular accommodated state.

Figure 5A:
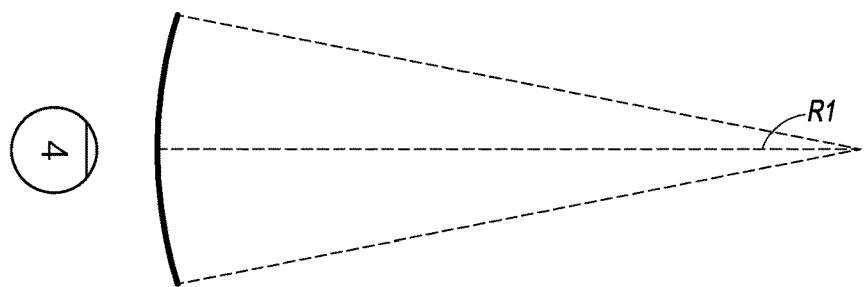
FIGS. 5A-5C illustrate relationships between radius of curvature and focal radius.
Figure 5B:
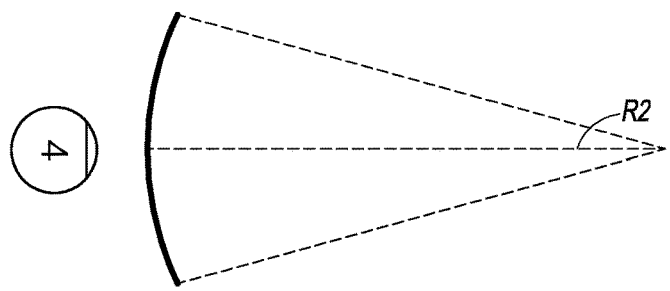
Figure 5C:
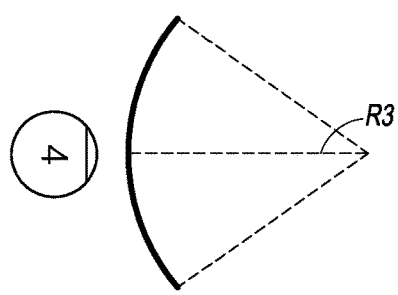

The distance between an object and the eye 4 or 6 can also change the amount of divergence of light from that object, as viewed by that eye. FIGS. 5A-5C illustrates relationships between distance and the divergence of light rays. The distance between the object and the eye 4 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 5A-5C and other figures herein, it will be appreciated that the discussions regarding eye 4 may be applied to both eyes 4 and 6 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 6:
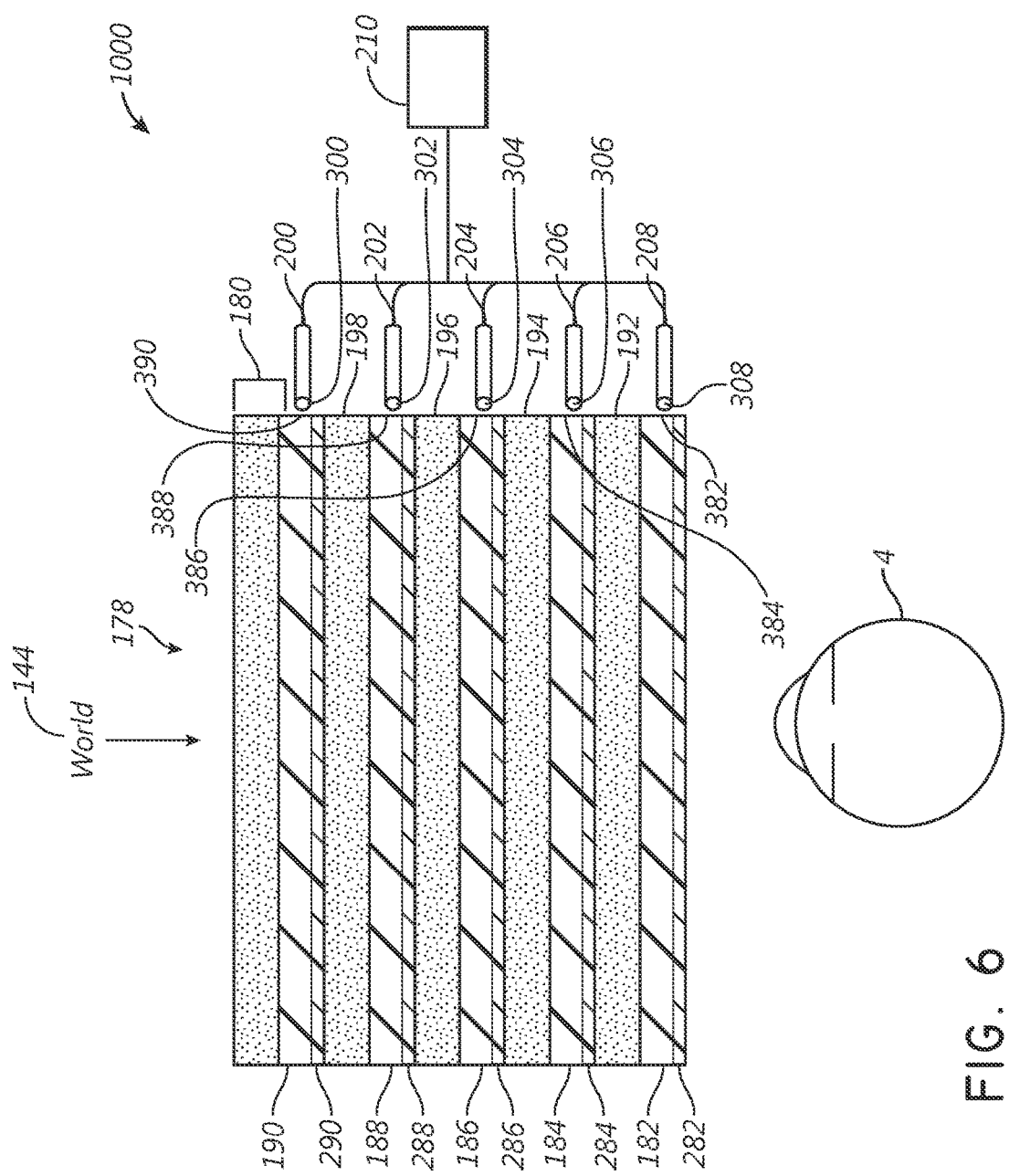
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 2, with FIG. 6 schematically showing some parts of that system 80 in greater detail. For example, the waveguide assembly 178 may be part of the display 62 of FIG. 2.

With continued reference to FIG. 6, the waveguide assembly 178 may also include a plurality of features 198, 196, 194, 192 between the waveguides. In some embodiments, the features 198, 196, 194, 192 may be lens. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input surface 382, 384, 386, 388, 390 of the waveguides 182, 184, 186, 188, 190. In some embodiments, the input surfaces 382, 384, 386, 388, 390 may be an edge of a corresponding waveguide, or may be part of a major surface of the corresponding waveguide (that is, one of the waveguide surfaces directly facing the world 144 or the viewer's eye 4). In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide. In some embodiments, a single one of the image injection devices 200, 202, 204, 206, 208 may be associated with and inject light into a plurality (e.g., three) of the waveguides 182, 184, 186, 188, 190.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208. It will be appreciated that the image information provided by the image injection devices 200, 202, 204, 206, 208 may include light of different wavelengths, or colors (e.g., different component colors, as discussed herein).

A controller 210 controls the operation of the stacked waveguide assembly 178 and the image injection devices 200, 202, 204, 206, 208. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1) in some embodiments.

With continued reference to FIG. 6, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include one or more outcoupling optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and the one or more outcoupling optical elements light may also be referred to light extracting optical elements. An extracted beam of light is outputted by the waveguide at locations at which the light propagating in the waveguide strikes a light extracting optical element. Some or all of the one or more outcoupling optical elements 282, 284, 286, 288, 290 may, for example, can be one or more gratings, including diffractive optical features, as discussed further herein. While illustrated disposed at the bottom major surfaces of the waveguides 182, 184, 186, 188, 190 for ease of description and drawing clarity, in some embodiments, the one or more outcoupling optical elements 282, 284, 286, 288, 290 may be disposed at the top and/or bottom major surfaces, and/or may be disposed directly in the volume of the waveguides 182, 184, 186, 188, 190, as discussed further herein. In some embodiments, the one or more outcoupling optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the one or more outcoupling optical elements 282, 284, 286, 288, 290 may be formed on a surface and/or in the interior of that piece of material.

With continued reference to FIG. 6, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it can reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184. Other ways of producing these perceived colors may be possible.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the one or more outcoupling optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This can provide advantages for forming a tiled image to provide an expanded field of view at those depth planes.

With continued reference to FIG. 6, the one or more outcoupling optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of one or more outcoupling optical elements 282, 284, 286, 288, 290, which output light with a different amount of divergence depending on the associated depth plane. In some embodiments, the features 198, 196, 194, 192 may not be lenses; rather, they may simply be spacers (e.g., cladding layers and/or structures for forming air gaps).

In some embodiments, the one or more outcoupling optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
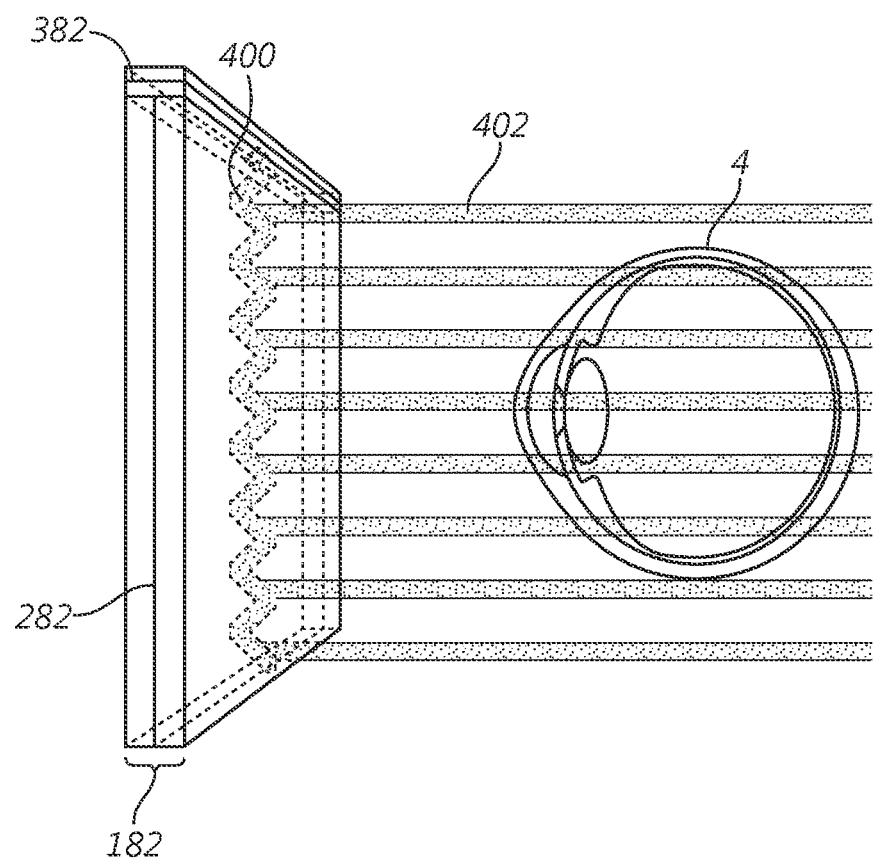
FIG. 7 shows an example of exit beams outputted by a waveguide.

FIG. 7 shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with one or more outcoupling optical elements that outcouple light to form images that appear to be set on a depth plane at a large distance (e.g., optical infinity) from the eye 4. Other waveguides or other sets of outcoupling optical elements may output an exit beam pattern that is more divergent, which would require the eye 4 to accommodate to a closer distance to bring it into focus on the retina and would be interpreted by the brain as light from a distance closer to the eye 4 than optical infinity.

Figure 8:
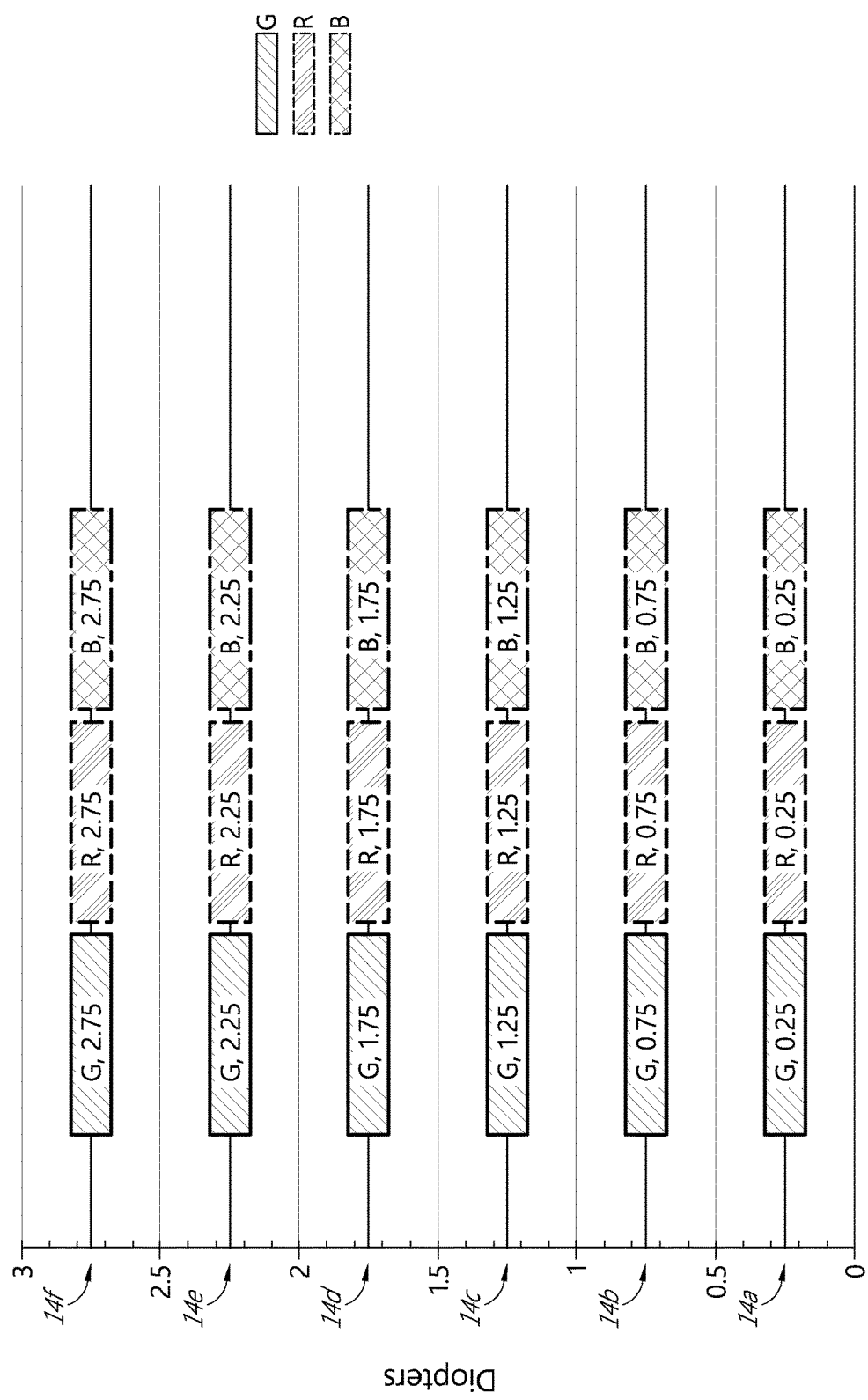
FIG. 8 schematically illustrates an example of a stacked waveguide assembly in which each depth plane includes images formed using multiple different component colors.

FIG. 8 schematically illustrates an example of a stacked waveguide assembly in which each depth plane includes images formed using multiple different component colors. In some embodiments, a full color image may be formed at each depth plane by overlaying images in each of the component colors, e.g., three or more component colors. The illustrated embodiment shows depth planes 14a-14f, although more or fewer depths are also contemplated. Each depth plane may have three component color images associated with it: a first image of a first color, G; a second image of a second color, R; and a third image of a third color, B. Different depth planes are indicated in the figure by different numbers for diopters following the letters G, R, and B. Just as examples, the numbers following each of these letters indicate diopters (1/m), or distance of the depth plane from a viewer, and each box in the figures represents an individual component color image.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this schematic drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

Figure 9A:
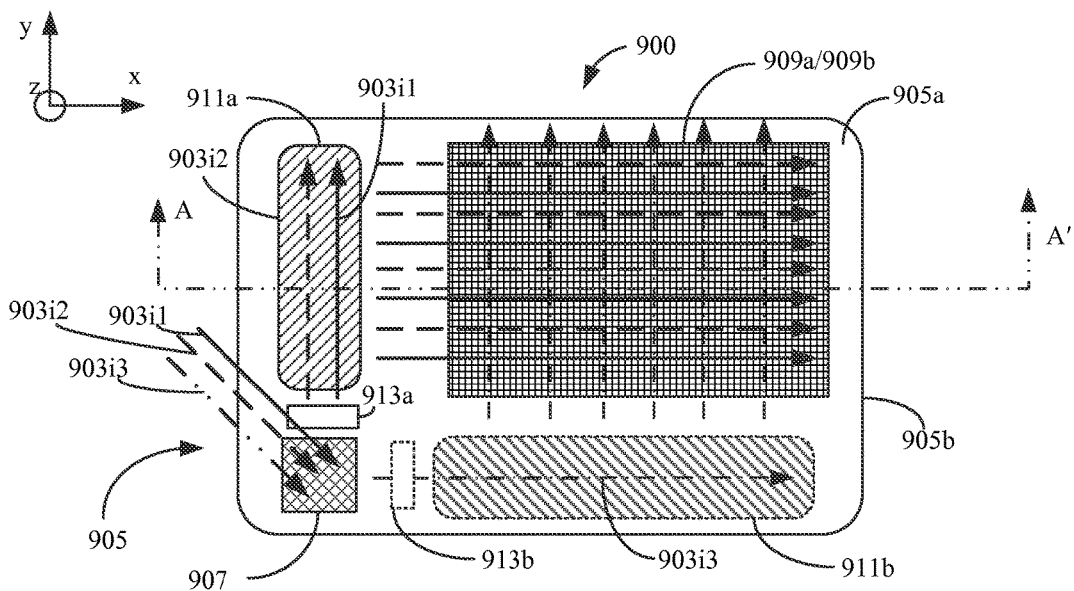
FIG. 9A schematically illustrates an example of a top view of a display device including a waveguide, an incoupling optical element, and an outcoupling optical element.

With reference now to FIG. 9A, an example of a top view of a display device 900 including a waveguide 905, an incoupling optical element 907 and one or more outcoupling optical elements 909a/909b is schematically illustrated. The waveguide 905 can be planar, having a first major surface 905a, a second major surface 905b opposite the first major surface 905b and edges extending between those first and the second major surfaces 905a and 905b. In such embodiments, the first and the second major surfaces 905a and 905b can extend in the x-y plane and a surface normal that intersects the first and the second major surfaces 905a and 905b can be oriented along the z-axis. The waveguide 905 can comprise an optical grade material that is configured to be transmissive to wavelengths in the visible spectrum or wavelengths corresponding to the component colors to be outputted by the waveguide 905. In various embodiments, the waveguides disclose herein, including the waveguide 905 can be monolithic piece of material. For example, the first and the second major surfaces 905a and 905b and the space between the two major surfaces 905a and 905b comprise the same material. In some embodiments, the waveguides may include multiple layers of material. For example, the space between the first and the second major surfaces 905a and 905b can include materials having a first refractive index and the space between the first and the second major surfaces 905a and 905b can include materials can include materials that have a different refractive index.

Figure 9B:
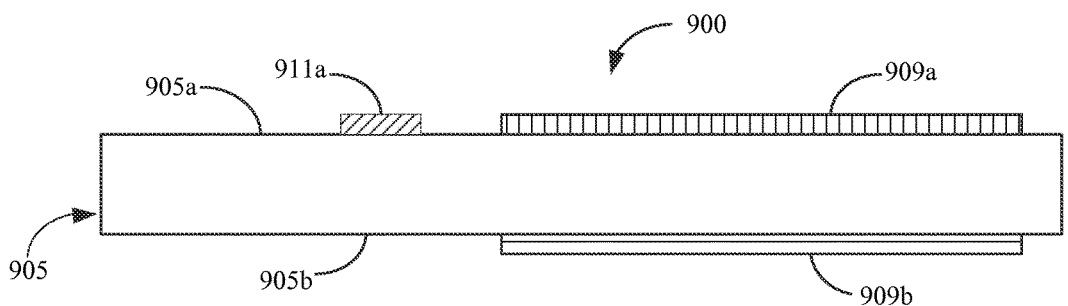
FIG. 9B schematically illustrates an example of a cross-sectional view of the display device depicted in FIG. 9A along the axis A-A'.

The one or more outcoupling optical coupling elements can include a first optical coupling element 909a and a second optical coupling element 909b, as depicted in FIG. 9B, which schematically illustrates an example of a cross-sectional view of the display device 900 along the axis A-A'. In some embodiments, the first and the second outcoupling optical elements 909a and 909b can be combined together to form a single outcoupling optical element, e.g., on the same major surface or on both the first second major surfaces 905a and 905b.

The incoupling optical element 907 is configured to incouple incident light of a first plurality of wavelengths such that they propagate through the waveguide 905 by total internal reflection along a first direction and incouple light incident of one or more second wavelengths such that they propagate through the waveguide 905 by total internal reflection along a second direction. The first and the second directions extend in a plane coplanar with the first or the second major surface 905a or 905b of the waveguide 905. For example, as shown in FIG. 9A, when the waveguide 905 is viewed along a direction parallel to the surface normal to the first or the second major surface 905a or 905b (e.g., as seen in a top-down view when the waveguide 905 is oriented with the first major surface 905a pointing upwards), the first direction can be parallel to the y-axis and the second direction can be parallel to the x-axis. Accordingly, FIG. 9A illustrates that the first and the second directions are orthogonal to each other in a plane coplanar with the first or the second major surface 905a or 905b. However, in other embodiments, the first and the second directions can be oriented with respect to each other at angles different from 90-degrees when viewed along a direction parallel to the surface normal to the first or the second major surface 905a or 905b. For example, the first and the second directions can be oriented with respect to each other at angles between about 60 degrees and 120 degrees, between about 70 degrees and about 110 degrees, between about 80 degrees and about 100 degrees, between about 85 degrees and about 95 degrees, or angles therebetween. Preferably, the angle is chosen such that light propagating in the first direction is deflected at high efficiency by one of the outcoupling elements and low efficiency by the other of the outcoupling optical elements, and light propagating in the second direction is deflected at high efficiency by the former outcoupling element and low efficiency by the latter outcoupling optical element.

The one or more second wavelengths can be different from the first plurality of wavelengths. In various embodiments, light having multiple component colors (e.g., red, green, blue) can be coupled into the waveguide. The first outcoupling optical element 909a is configured to redirect, out of the waveguide 905, light of the first plurality of wavelengths that propagate through the waveguide 905 along the first direction; and the second outcoupling optical element 909b is configured to redirect, out of the waveguide 905, light of the one or more second wavelengths that propagate through the waveguide 905 along the second direction. In some embodiments, the first plurality of wavelengths encompasses light of two component colors, e.g., red and blue; and the one or more second wavelengths encompasses light of a third component color, e.g., green. Preferably, the two component colors have a greater difference between the wavelengths of those two component colors than the difference between either of the two component colors and the wavelength of the third color, which can facilitate reductions in crosstalk. In some embodiments, the first outcoupling optical element 909a includes ASRs, which deflect light of each of the two component colors.

It will be appreciated that the waveguide 905 may be part of the stack of waveguides in the display system 1000 (FIG. 6). For example, the waveguide 905 may correspond to one of the waveguides 182, 184, 186, 188, 190, and the outcoupling optical elements 909a and 909b may correspond to the outcoupling optical elements 282, 284, 286, 288, 290 of FIG. 6.

With continued reference to FIGS. 9A and 9B, in various embodiments, the incoupling optical element 907 can be a wavelength selective optical component that is configured to deflect different wavelengths of light such that they propagate along different directions through the waveguide 905 by TIR. For example, the incoupling optical element 907 can comprise a first set of incoupling optical elements configured to interact with light at the first plurality of wavelengths and a second set of incoupling optical elements configured to interact with light at the one or more second wavelengths. In various embodiments, the elements forming the incoupling optical element 907 can include one or more optical prism, or optical components including one or more diffractive elements and/or refractive elements.

In some embodiments, the incoupling optical element 907 can include one or more gratings that can interact with light at one or more wavelengths. For example, if the incident light comprises light at red, green and blue wavelengths, then the incoupling optical element 907 can include a grating that interacts with all three wavelengths or a first grating that interacts with red light, a second grating that interact with green light and a third grating that interacts with blue light. In some embodiments, the first grating that interacts with red light and the third grating that interacts with blue light can be combined in a single grating structure. The one or more gratings included in the incoupling optical element 907 can include one or more of analog surface relief grating (ASR), Binary surface relief structures (BSR), Volume Holographic Optical Elements (VHOE), Digital Surface Relief structures and/or volume phase holographic material (e.g., holograms recorded in volume phase holographic material), or switchable diffractive optical element (e.g., Polymer Dispersed Liquid Crystal (PDLC) grating). Other types of grating, holograms, and/or diffractive optical elements, providing the functionality disclosed herein, may also be used. The one or more gratings are configured to direct incident light in the first plurality of wavelengths—represented by rays 903i1 and 903i2—such that the light in the first plurality of wavelengths propagates through the waveguide 905 along the first direction (e.g., along a direction parallel to the y-axis) and direct incident light at the one or more second wavelengths—represented by ray 903*i*3—such that light at the one or more second wavelengths propagates through the waveguide along the second direction (e.g., along a direction parallel to the x-axis). Accordingly, the one or more gratings are configured to couple light into the waveguide 905 by deflecting light incident from a direction forward of the first major surface 905a or rearward of the second major surface 905b at appropriate angles that results in the incident light to undergo TIR in the waveguide 905. The incoupling optical element 907 can include a reflective grating and/or transmissive grating. In some embodiments including one or more reflective gratings, incoming light is incident on the grating from within the waveguide 905 and is diffracted along the first or the second directions of the waveguide 905.

In some embodiments, one or more wavelength selective filters 913a and 913b may be integrated with or disposed adjacent to the incoupling optical elements 907. The one or more wavelength selective filters 913a and 913b may be configured to filter out some portion of light at the one or more second wavelengths that may be propagating along the first direction and some portion of light at the first plurality of wavelengths that may be propagating along the second direction respectively. In some embodiments, the wavelength selective filters 913a and 913b can be absorptive filters. For example, in various embodiments, the wavelength selective filters 1013a and 1013b can be color band absorbers.

Figure 9C:
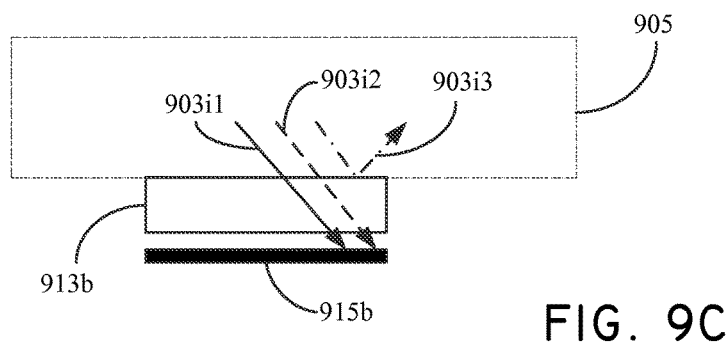
FIG. 9C illustrates an example of a dichroic wavelength selective filter and depicts the operation of the dichroic wavelength selective filter.

In some embodiments, the wavelength selective filters 913a and 913b can include a dichroic filter. FIG. 9C illustrates an example of a dichroic wavelength selective filter 913b and depicts the operation of that dichroic wavelength selective filter. The dichroic wavelength selective filter 913b (or 913a) is configured to pass or transmit light at the first plurality of wavelengths (or the one or more second wavelengths) that is propagating along the second direction (or the first direction) by TIR and reflect the one or more second wavelengths (or the first plurality of wavelengths) propagating along the second direction (or the first direction) by TIR. The light that is passed through the dichroic wavelength selective filter 913b (or 913a) is absorbed by an absorber 915b that is integrated with or disposed adjacent to the dichroic wavelength selective filter 913b (or 913a). In this manner, the incoupling optical element 907 either individually or in combination with the wavelength selective filter 913b (or 913a) and absorber 915b can increase the degree of isolation between incoupled light at the first plurality of wavelengths propagating through the waveguide 905 along the first direction and incoupled light at the one or more second wavelengths propagating through the waveguide 905 along the second direction. In other words, the incoupling optical element 907 either individually or in combination with the wavelength selective filter 913b (or 913a) and absorber 915b can, by limiting the amount of light of different wavelengths propagating through the waveguide 905, reduce crosstalk between incoupled light at the first plurality of wavelengths propagating through the waveguide 905 along the first direction and incoupled light at the one or more second wavelengths propagating through the waveguide 905 along the second direction. Reducing crosstalk between incoupled light at the first plurality of wavelengths propagating through the waveguide 905 along the first direction and incoupled light at the one or more second wavelengths propagating through the waveguide 905 along the second direction can be advantageous in improving the outcoupling efficiency of the first and the second outcoupling optical elements 909a and 909b and also improve the quality of the color image generated by the outcoupled light.

The incoupling optical element 907 can be disposed adjacent the first or the second major surface 905a or 905b of the waveguide 905. In various embodiments, the incoupling optical element 907 can be disposed adjacent a corner of the waveguide 905. The incoupling optical element 907 can be distinct from the waveguide 905. Alternately, the incoupling optical element 907 can be integrated with one or both of the first or the second major surface 905a or 905b of the waveguide 905. In various embodiments, the incoupling optical element 907 and the waveguide 905 can be monolithically integrated. In various embodiments, the incoupling optical element 907 can be formed in a portion of the waveguide 905. For example, in embodiments, in which the incoupling optical element 907 include one or more gratings, the one or more gratings may be formed in a portion of the first and/or the second major surface 905a and/or 905b of the waveguide 905. In various embodiments, the incoupling optical element 907 may be disposed in a layer of optical transmissive material which is disposed adjacent to the first and/or the second major surface 905a and/or 905b of the waveguide 905. In some other embodiments, as disclosed herein, the incoupling optical element 907 may be disposed in the bulk of waveguide 905.

In various embodiments, the display device 900 can include first light distributing element 911a disposed in the light path of the incoupled light at the first plurality of wavelengths propagating through the waveguide 905 along the first direction. The display device 900 can also include second light distributing element 911b disposed in the light path of the incoupled light at the one or more second wavelengths propagating through the waveguide 905 along the second direction. The first and the second light distributing elements 911a and 911b can be configured to distribute light of the first plurality of wavelengths and of the one or more second wavelengths along the first and the second direction respectively. For example, in various embodiments, the first and the second light distributing elements 911a and 911b can be configured to elongate light (e.g., spread light across the length) of the first plurality of wavelengths and of the one or more second wavelengths along the first and second directions respectively. The first and second light distributing elements 911a and 911b can be referred to as pupil expanders or orthogonal pupil expanders (OPEs) since by virtue of distributing light along the first and the second directions, they can advantageously increase the spot size of a first light beam including light at the first plurality of wavelengths and a second light beam including light at the one or more second wavelengths. The first and second light distributing elements 911a and 911b can also be useful to increase the size of the exit pupil of the display device 900. Increasing the size of the exit pupil can be useful when the display device 900 is configured to be directly viewed by a user and/or in near-to-eye display applications. Increasing the size of the exit pupil can also be advantageous in alleviating the strain on eye when viewing the display device 900.

The first and the second light distributing elements 911a and 911b can include one or more gratings that are configured to direct light propagating along the first and the second direction respectively towards the first and the second outcoupling optical elements 909a and 909b. The one or more gratings can be configured, for example, to have a size (e.g., groove depth or groove height, shape, spacing, and/or periodicity) and an orientation that is configured to interact with light of the first plurality of wavelengths propagating along the first direction or light of the one or more second wavelengths propagating along the second direction. For example, if light of the first plurality of wavelengths includes red and blue light, then the first light distributing element 911a can include a grating that is configured to interact with red and blue light or a first grating that interacts with red light and a second grating that interacts with blue light. Similarly, if light of the one or more second wavelengths includes green light, then the second light distributing element 911b can include a grating that is configured to interact with green light.

In some embodiments, the first and the second light distributing elements 911a and 911b are each configured to redirect a portion of the light that impinges on the gratings at as the light every bounce as the incoupled light at the first plurality of wavelengths and at the one or more second wavelengths propagates through the waveguide by TIR. The first and the second light distributing elements 911a and 911b can divide the first and the second light beams propagating along the first and the second directions into multiple related beams that are redirected towards the first and the second outcoupling optical elements 909a and 909b. In various embodiments, the multiple related beams can be copies of each other. In this manner, the first and the second light distributing elements 911a and 911b can be configured to uniformly or substantially uniformly illuminate a larger area of the first and the second outcoupling optical elements 909a and 909b which can result in a fairly uniform pattern of exit emission from the waveguide 905. Without any loss of generality, the first and the second light distributing elements 911a and 911b can be configured to redirect light incident at a single wavelength or multiple wavelengths within a wavelength range.

In various embodiments, the one or more gratings included in the first and the second light distributing elements 911a and 911b can include one or more of an analog surface relief grating (ASR), Binary surface relief structures (BSR), a Volume Holographic Optical Element (VHOE), Digital Surface Relief structures and/or volume phase holographic material, or a switchable diffractive optical element (e.g., Polymer Dispersed Liquid Crystal (PDLC) grating). Other types of gratings, holograms, and/or diffractive optical elements, configured to provide the functionality disclosed herein, may also be used. The first and the second light distributing elements 911a and 911b can be disposed adjacent the first or the second major surface 905a or 905b of the waveguide 905. In various embodiments, the first and the second light distributing elements 911a and 911b can be disposed such that they are spaced apart from the first and the outcoupling optical elements 909a and 909b, although the first and the second light distributing elements 911a and 911b need not be so configured in some embodiments. The first and the second light distributing elements 911a and 911b can be integrated with one or both of the first or the second major surface 905a or 905b of the waveguide 905. In various embodiments, the first and the second light distributing elements 911a and 911b and the waveguide 905 can be monolithically integrated. In various embodiments, the first and the second light distributing elements 911a and 911b can be formed in a portion of the first and/or the second major surface 905a and/or 905b of the waveguide 905. In various embodiments, the first and the second light distributing elements 911a and 911b may be disposed in one or more layers of optical transmissive material which are disposed adjacent to the first and/or the second major surface 905a and/or 905b of the waveguide 905. In some other embodiments, as disclosed herein, the first and the second light distributing elements 911a and 911b may be disposed in the bulk of waveguide 905.

As discussed above, the first outcoupling optical element 909a and the second outcoupling optical element 909b are configured to redirect incoupled light that is incident on them out of the plane of the waveguide 905. The first and the second outcoupling elements 909a and 909b are configured to redirect the incoupled light that is incident on the first and the second outcoupling elements 909a and 909b toward the viewer (e.g., eye 4, FIG. 7) at appropriate angles to ensure proper overlay of light at different wavelengths such that the viewer can perceive a color image of good visual quality. The first and the second outcoupling optical elements 909a and 909b can have an optical power that provides a divergence to the light that exits through the waveguide 905 such that the image formed by the light that exits through the waveguide 905 appears to originate from a certain depth. Accordingly, the waveguide 905 may be considered to have an associated depth plane that is correlated with the optical power of the first and the second outcoupling optical elements 909a and 909b. As discussed herein, various embodiments of display devices can include a plurality different waveguides similar to waveguide 905 described above— including the incoupling optical element 907 and the first and the second outcoupling optical elements 909a and 909b with different optical powers—that are stacked together. In such embodiments, the different waveguides can be associated with different depth planes corresponding to the different optical powers of the first and the second outcoupling optical elements 909a and 909b including therein. Display devices including such plurality of different waveguides stacked together can be useful to generate 3D images and, in particular, light field based 3D images.

As discussed above, the first outcoupling optical element 909a and the second outcoupling optical element 909b can include one or more gratings. For example, the first outcoupling element 909a can include one or more gratings that are configured to interact with light of the first plurality of wavelengths and the second outcoupling element 909b can include one or more gratings that are configured to interact with light of the one or more second wavelengths. For example, if the first plurality of wavelengths includes red and blue wavelengths, then the first outcoupling element 909a can include a grating structure that interacts with both red and blue light or a first grating that interacts with red light and a second grating that interacts with blue light. As another example, if the one or more second wavelengths includes green wavelength, then the second outcoupling element 909b can include a grating that interacts with green light.

The first and the second outcoupling elements 909a and 909b can include linear grooves that are configured such that light propagating along a direction substantially parallel to the length of grooves is not sufficiently deflected from its path such that it is couple out of the waveguide. In contrast, light propagating along a direction that is at an angle with respect to the grooves (e.g., perpendicular to the length of the grooves) such that it impinges or strikes the grooves and is deflected at angles that do not satisfy requirements for TIR and are thus coupled out of the waveguide 905. Accordingly, the grooves in the first outcoupling element 909a are oriented along a direction parallel or substantially parallel to the second direction such that the light at the one or more second wavelengths propagating along the second direction are not sufficiently deflected by the first outcoupling optical element 909a to be outcoupled out of the waveguide 905 and light at the first plurality of wavelengths propagating along the first direction are sufficiently deflected by the first outcoupling optical element 909a to be outcoupled out of the waveguide 905. The grooves in the second outcoupling element 909b are oriented along a direction parallel or substantially parallel to the first direction such that the light at the first plurality of wavelengths propagating along the first direction are not sufficiently deflected by the second outcoupling optical element 909b to be outcoupled out of the waveguide 905 and light of one or more second wavelengths propagating along the second direction is sufficiently deflected by the second outcoupling optical element 909b to be outcoupled out of the waveguide 905.

The first outcoupling optical element 909a and the second outcoupling optical element 909b can include analog surface relief grating (ASR), Binary surface relief structures (BSR), Volume Holographic Optical Elements (VHOE), Digital Surface Relief structures and/or volume phase holographic material (e.g., holograms recorded in volume phase holographic material), or switchable diffractive optical element (e.g., Polymer Dispersed Liquid Crystal (PDLC) grating). Other types of gratings, holograms, and/or diffractive optical elements, providing the functionality disclosed herein, may also be used. In various embodiments, the first and the second outcoupling optical elements 909a and 909b can be integrated as a single outcoupling optical element 909. For example, a single outcoupling optical element 909 including different holograms for different wavelengths (e.g., red, green and blue) recorded on top of each other can be disposed on one of the major surfaces 905a and 905b instead of two outcoupling optical elements 909a and 909b disposed on the first and the second major surface 905a and 905b as shown in FIG. 9B. In some embodiments, the first outcoupling optical element 909a can be disposed on one of the first or the second major surface 905a or 905b and the second outcoupling optical element 909b can be disposed on the other major surface. The first and the second outcoupling optical element 909a and 909b can be formed on one or both of the first and the second major surface 905a and 905b. In various embodiments, the first and the second outcoupling element can be formed on a layer that is disposed on one of the first or the second major surface 905a or 905b.

Figure 10A:
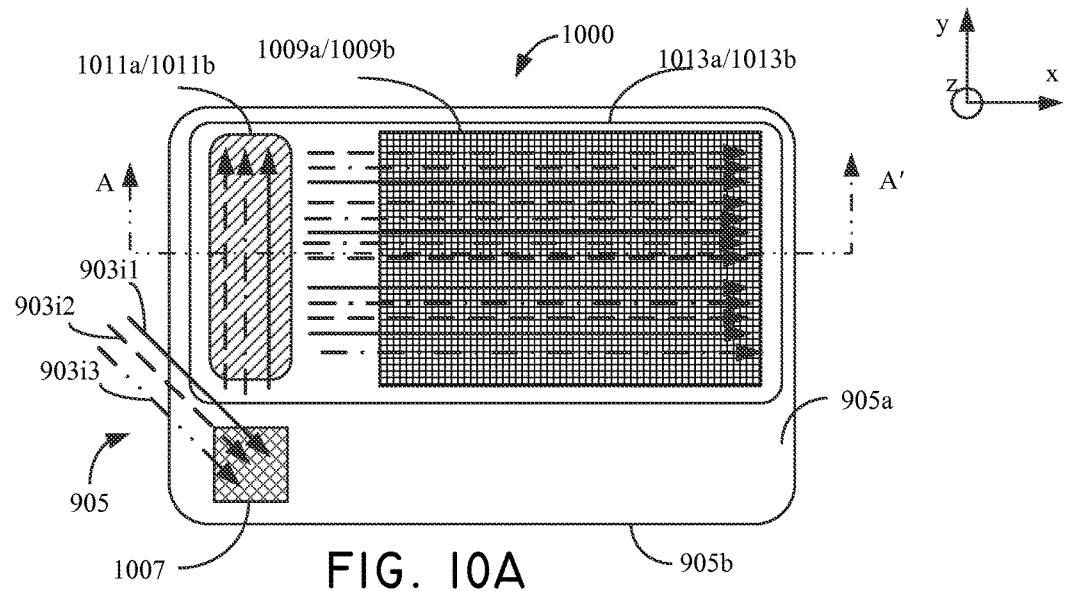
FIG. 10A schematically illustrates an example of a top view of a display device including a waveguide, an incoupling optical element, wavelength selective filters, and first and second outcoupling optical elements.
Figure 10B:
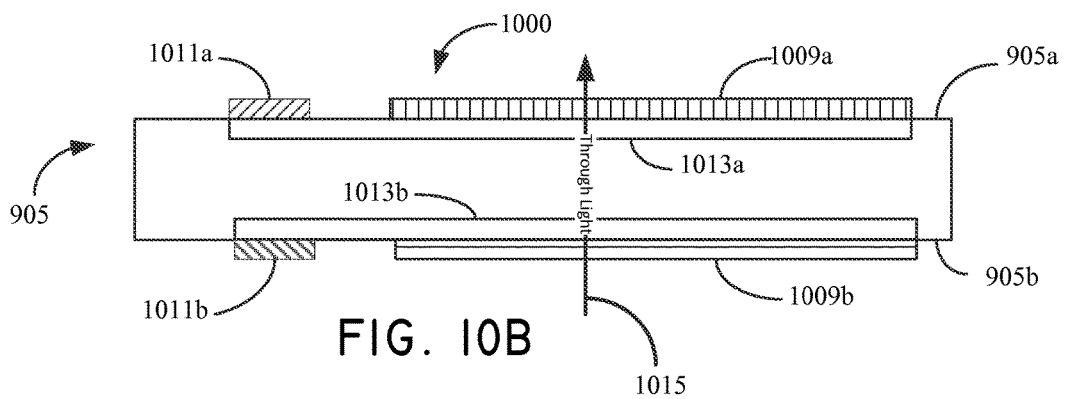
FIGS. 10B and 10C illustrate examples of a cross-sectional view of the display device depicted in FIG. 10A along the axis A-A'.
Figure 10C:
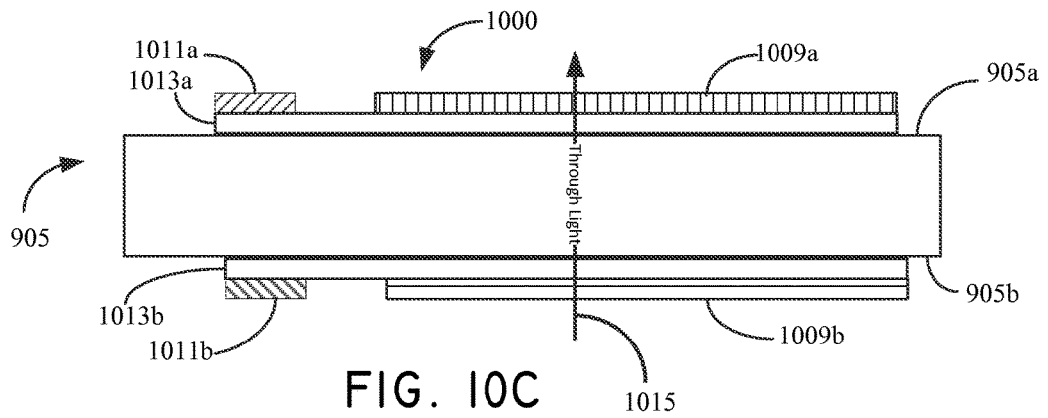

FIG. 10A schematically illustrates an example of a top view of a display device 1000 including a waveguide 905, incoupling optical element 1007, wavelength selective filters 1013a and 1013b, and first and second outcoupling optical elements 1009a and 1009b. FIGS. 10B and 10C illustrate examples of a cross-sectional view of the display device 1000 depicted in FIG. 10A along the axis A-A'. The display device is configured such that incoming incident light of different wavelengths represented by rays 903i1, 903i2 and 903i3 are coupled into the waveguide 905 by the incoupling optical element 1007. The incoupling optical element 1007 can be configured to couple all wavelengths of the incident light into the waveguide 905 at appropriate angles that support propagation through the waveguide by virtue of TIR. In various embodiments, the incoupling optical element 1007 need not be configured to incouple the different wavelengths of incident light such that they propagate along different directions. Thus, in some embodiments, all the wavelengths of the incident light can be coupled into the waveguide 905 such that they propagate through the waveguide along a same direction. The incoupling optical element can include a plurality of gratings, such as, for example, analog surface relief grating (ASR), Binary surface relief structures (BSR), Volume Holographic Optical Elements (VHOE), Digital Surface Relief structures and/or volume phase holographic material (e.g., holograms recorded in volume phase holographic material), or switchable diffractive optical element (e.g., a Polymer Dispersed Liquid Crystal (PDLC) grating). Other types of gratings, holograms, and/or diffractive optical elements, providing the functionality disclosed herein, may also be used. In various embodiments, the incoupling optical element 1007 can include one or more optical prisms, or optical components including one or more diffractive elements and/or refractive elements.

The display device 1000 includes wavelength selective filters 1013a and 1013b, each wavelength selective filter 1013a and 1013b being associated with one of the outcoupling optical element 1009a and 1009b. In the illustrated embodiment, wavelength selective filter 1013a is associated with outcoupling optical element 1009a and wavelength selective filter 1013b is associated with outcoupling optical element 1009b. The wavelength selective filter 1013a includes a first rearward surface and a first forward surface opposite the first rearward surface. The wavelength selective filter 1013b includes a second rearward surface and a second forward surface opposite the second rearward surface. In some embodiments, the wavelength selective filter 1013a can be disposed on the first major surface of the waveguide 905, in a recess, e.g., such that the first forward surface is on the same level as portions of the first major surface 905a of the waveguide 905, as illustrated in FIG. 10B. In some other embodiments, the wavelength selective filter 1013a can be disposed such that the first rearward surface simply overlies the first major surface 905a (without being disposed in a recess) as illustrated in FIG. 10C. In some embodiments, the wavelength selective filter 1013b can be disposed in a recess in the second major surface of the waveguide 905, e.g., such that the second forward surface is on the same level as the second major surface 905b of the waveguide 905 as illustrated in FIG. 10B. In some other embodiments, the wavelength selective filter 1013b can be disposed such that the second rearward surface simply underlies the second major surface 905b (without being disposed in a recess) as illustrated in FIG. 10C. Light propagating in the waveguide 905 is incident on the first or the second rearward surface of the first or the second wavelength selective filter 1013a or 1013b respectively. Light of the first plurality of wavelengths (or the one or more second wavelengths) are transmitted through the first rearward surface (or the second rearward surface) of the first wavelength selective filter 1013a (or the second wavelength selective filter 1013b). The first and the second wavelength selective filter 1013a and 1013b are capable of reflecting a portion of the light transmitted through the first or the second rearward surface.

The wavelength selective filter 1013a is configured to transmit a portion of light at a first plurality of wavelengths (e.g., light at red and blue wavelength ranges) that are propagating through the waveguide 905 by multiple reflections towards the respective outcoupling optical element 1009a that are configured to deflect the first plurality of wavelengths out of the waveguide 905. The wavelength selective filter 1013a is configured to reflect light at wavelengths different from the first plurality of wavelengths away from the outcoupling optical element 1009a. Similarly, the wavelength selective filter 1013b is configured to transmit a portion of light of one or more second wavelengths (e.g., light in the green wavelength range) that are propagating through the waveguide 905 by multiple reflections towards the respective outcoupling optical element 1009b that are configured to deflect light of the one or more second wavelengths out of the waveguide 905. The wavelength selective filter 1013*b* is configured to reflect light at wavelengths different from the one or more second wavelengths away from the outcoupling optical element 1009*b*. In this manner, the wavelength selective filters 1013*a* and 1013*b* can reduce crosstalk between the different wavelengths of light that are coupled out of the waveguide 905 to generate the color image.

In various embodiments, the wavelength selective filters 1013*a* and 1013*b* can include one or more dichroic filters. The wavelength selective filters 1013*a* and 1013*b* can be disposed on the first and the second major surfaces 905*a* and 905*b* of the waveguide 905. Without any loss of generality, the wavelengths selective filters 1013*a* and 1013*b* can be configured to transmit light that is incident on the filters 1013*a* and 1013*b* at near normal angles. For example, when the wavelength selective filters 1013*a* and 1013*b* are disposed parallel to the first and the second major surfaces 905*a* and 905*b*, light that is incident at angles between, e.g., about 0 degrees and about 20 degrees with respect to a normal to the first and the second major surfaces 905*a* and 905*b* can be transmitted through the wavelength selective filters 1013*a* and 1013*b*. Accordingly, the wavelength selective filters 1013*a* and 1013*b* can be configured to transmit through light from the surrounding scene that is viewed by a viewer through the waveguide.

The first and the second outcoupling optical elements 1009*a* and 1009*b* can be disposed on the corresponding wavelength selective filter 1013*a* and 1013*b*. For example, the first outcoupling optical element 1009*a* is disposed on the corresponding wavelength selective filter 1013*a* and configured to outcouple light at the first plurality of wavelengths that are transmitted through the wavelength selective filter 1013*a* out of the waveguide 905. Similarly, the second outcoupling optical element 1009*b* are disposed on the corresponding wavelength selective filter 1013*b* and configured to outcouple light of the one or more second wavelengths that are transmitted through the wavelength selective filter 1013*b* out of the waveguide 905. In some embodiments, as noted herein, the first plurality of wavelengths encompasses light of two component colors, e.g., red and blue; and the one or more second wavelengths encompasses light of a third component color, e.g., green. Preferably, the two component colors have a greater difference between the wavelengths of those two component colors than the difference between either of the two component colors and the wavelength of the third color, which can facilitate reductions in crosstalk. In some embodiments, the first outcoupling optical element 1009*a* includes one or more ASRs, which deflect light of each of the two component colors and the second outcoupling optical element 1009*b* includes ASR, which deflects light of the third component color.

It will be appreciated that the waveguide 905 may be part of the stack of waveguides in the display system 1000 (FIG. 6). For example, the waveguide 905 may correspond to one of the waveguides 182, 184, 186, 188, 190, and the outcoupling optical elements 1009*a*, 1009*b* and wavelength selective filter 1013*a*, 1013*b* may correspond to the outcoupling optical elements 282, 284, 286, 288, 290 of FIG. 6.

The first and the second outcoupling optical elements 1009*a* and 1009*b* can be physically and functionally similar to the first and the second outcoupling optical elements 909*a* and 909*b* described above with reference to FIGS. 9A and 9B. For example, the first and the second outcoupling optical elements 1009*a* and 1009*b* can include diffractive structures, such as, for example, one or more of analog surface relief gratings (ASR), Binary surface relief structures (BSR), Volume Holographic Optical Elements (VHOE), Digital Surface Relief structures and/or volume phase holographic material (e.g., holograms recorded in volume phase holographic material), or switchable diffractive optical element (e.g., Polymer Dispersed Liquid Crystal (PDLC) grating).

Similar to the first outcoupling optical elements 909*a* and the second outcoupling optical elements 909*b*, first and second outcoupling optical element 1009*a* and 1009*b* are configured to redirect incoupled light that is incident on them out of the plane of the waveguide 905 at appropriate angles and efficiencies to facilitate or ensure proper overlay of light at different wavelengths such that a viewer can perceive a color image of good visual quality. The first and the second outcoupling optical elements 1009*a* and 1009*b* can have an optical power that provides a divergence to the light that exits through the waveguide 905 such that the image formed by the light that exits through the waveguide 905 appears to originate from a certain depth.

Light redistributing elements, such as, for example, first and second light distributing elements 1011*a* and 1011*b* can be disposed in the optical path along which the different wavelengths of light propagate through the waveguide 905. The first and the second light distributing elements 1011*a* and 1011*b* can be physically and functionally similar to the first and second light distributing elements 911*a* and 911*b* described above with reference to FIGS. 9A and 9B. For example, the first and the second light distributing elements 1011*a* and 1011*b* can include diffractive structures, such as, for example, one or more of analog surface relief grating (ASR), Binary surface relief structures (BSR), Volume Holographic Optical Elements (VHOE), Digital Surface Relief structures and/or volume phase holographic material (e.g., holograms recorded in volume phase holographic material), or switchable diffractive optical element (e.g., Polymer Dispersed Liquid Crystal (PDLC) grating). The first and the second light distributing elements 1011*a* and 1011*b* can be configured to redirect a portion of the light that interacts with them as it propagates through the waveguide 905 towards the first and the second outcoupling optical elements 1009*a* and 1009*b* thereby enlarging the beam size of the interacting light along the direction of propagation. Accordingly, the first and the second light distributing elements 1011*a* and 1011*b* may be advantageous in enlarging the exit pupil of the display device 1000 including the waveguide 905. In some embodiments, the first and the second light distributing elements 1011*a* and 1011*b* may thus function as orthogonal pupil expanders (OPE's).

Similar to the first and second light distributing elements 911*a* and 911*b*, the first and the second light distributing elements 1011*a* and 1011*b* can be disposed on one or both of the first and the second major surfaces 905*a* and 905*b* of the waveguide. In the embodiment illustrated in FIGS. 10A and 10B, the first light distributing elements 1011*a* is disposed on the first major surface 905*a* and the second light distributing elements 1011*b* is disposed on the second major surface 905*b*. In other embodiments, the first and the second light distributing elements 1011*a* and 1011*b* can be disposed on the same major surface of the waveguide 905. In various embodiments, the first and the second light distributing elements 1011*a* and 1011*b* can be combined to form a single light distributing optical element.

In various embodiments, the first and the second light distributing elements 1011*a* can be configured to be wavelength selective such that they have higher redirection efficiency for certain wavelengths of light than other wavelengths of light. For example, in various embodiments, the first light redistributing element 1011*a* can be configured to redirect light at the first plurality of wavelengths towards the first outcoupling optical element 1009a and the second light redistributing element 1011b can be configured to redirect light of the one or more second wavelengths towards the second outcoupling optical element 1009b. In such embodiments, the first light distributing element 1011a can be disposed over the first wavelength selective filter 1013a and the second light distributing element 1011b can be disposed over the second wavelength selective filter 1013b. In this manner, the amount of light at the one or more second (or first plurality of) wavelengths that is redirected towards the first (or second) outcoupling optical element 1009a (or 1009b) by the first (or second) light distributing elements 1011a (or 1011b) can be reduced.

In the embodiments discussed above with reference to FIGS. 9A-10B, the first and the second outcoupling optical elements 909a, 909b, 1009a and 1009b can be configured to diffract light symmetrically on either side of the first or the second major surface that they are disposed on so that light from the waveguide is diffracted forward as well as rearward of the major surfaces 905a and 905b. Accordingly, the quality of color image is not compromised even if some of the colors of the color image are output by outcoupling elements disposed on one major surface of the waveguide and some other colors of the color image are generated by light output by outcoupling elements disposed on the other major surface of the waveguide.

Additionally, the various incoupling and outcoupling optical elements and the light distributing elements can be configured to interact with light at a plurality of different wavelengths by combining different sets of diffractive structures, each of the different sets of diffractive structures being configured to interact with light at a single wavelength. The different sets of diffractive structures can be disposed on the waveguide by using fabrication methods such as injection compression molding, UV replication or nano-imprinting of the diffractive structures.

Figure 11A:
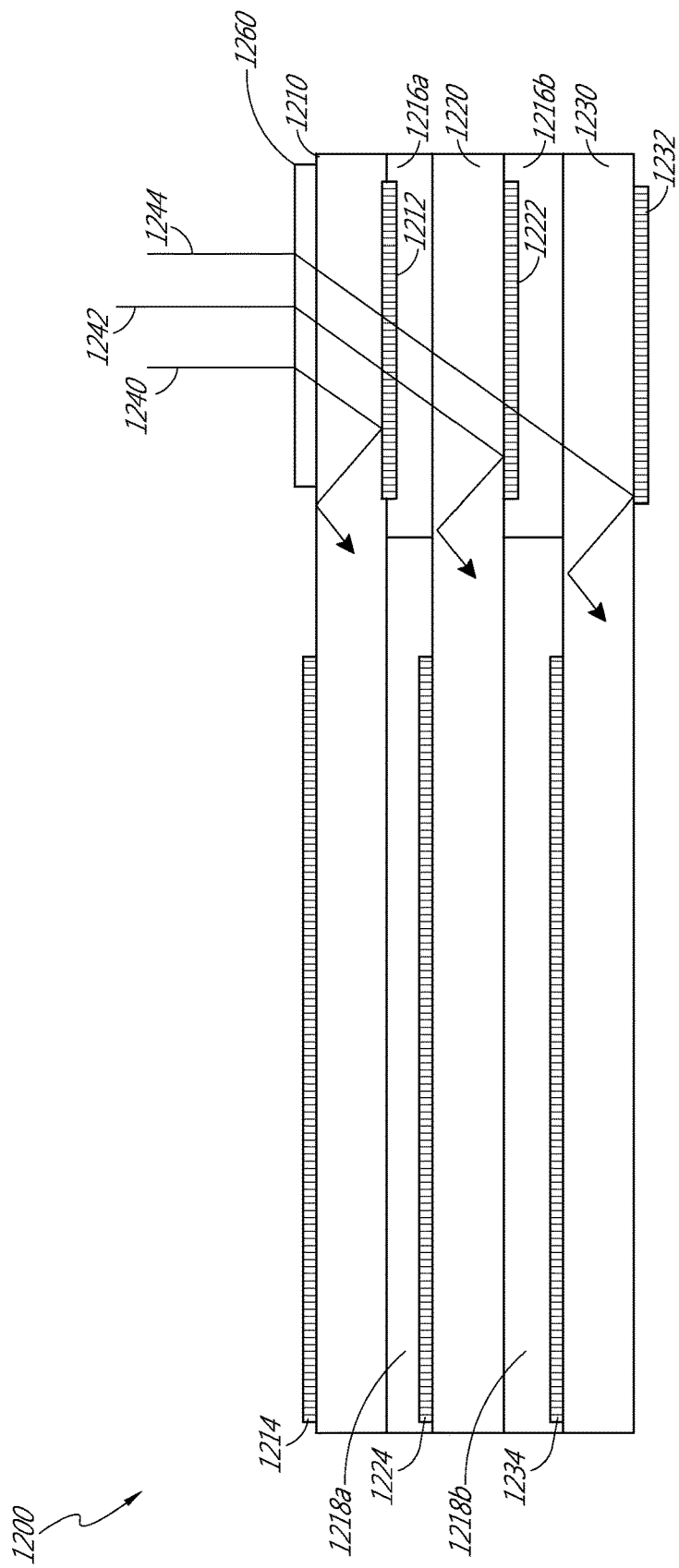
FIG. 11A illustrates an example of a cross-sectional side view of a plurality of stacked waveguides that are each configured to output light of a different wavelength or range of wavelengths.

With reference now to FIG. 11A, an example is illustrated of a cross-sectional side view of a plurality or set 1200 of stacked waveguides that are each configured to output light of a different wavelength or range of wavelengths. The set 1200 of stacked waveguides includes waveguides 1210, 1220, and 1230. Each waveguide includes an associated incoupling optical element, with, e.g., incoupling optical element 1212 disposed on a major surface (e.g., a bottom major surface) of waveguide 1210, incoupling optical element 1224 disposed on a major surface (e.g., a bottom major surface) of waveguide 1220, and incoupling optical element 1232 disposed on a major surface (e.g., a bottom major surface) of waveguide 1230. In some embodiments, one or more of the incoupling optical elements 1212, 1222, 1232 may be disposed on the top major surface of the respective waveguide 1210, 1220, 1230 (particularly where the one or more incoupling optical elements are transmissive, deflecting optical elements). Preferably, the incoupling optical elements 1212, 1222, 1232 are disposed on the bottom major surface of their respective waveguide 1210, 1220, 1230 (or the top of the next lower waveguide). In some embodiments, the incoupling optical elements 1212, 1222, 1232 may be disposed in the body of the respective waveguide 1210, 1220, 1230. Preferably, the incoupling optical elements 1212, 1222, 1232 are color filters, including filters that selectively reflect one or more wavelengths of light, while transmitting other wavelengths of light. Examples of colors filters include dichroic filters, as discussed herein. While illustrated on one side or corner of their respective waveguide 1210, 1220, 1230, it will be appreciated that the incoupling optical elements 1212, 1222, 1232 may be disposed in other areas of their respective waveguide 1210, 1220, 1230 in some embodiments.

Each waveguide also includes associated light distributing elements, with, e.g., light distributing elements 1214 disposed on a major surface (e.g., a top major surface) of waveguide 1210, light distributing elements 1224 disposed on a major surface (e.g., a top major surface) of waveguide 1220, and light distributing elements 1234 disposed on a major surface (e.g., a top major surface) of waveguide 1230. In some other embodiments, the light distributing elements 1214, 1224, 1234, may be disposed on a bottom major surface of associated waveguides 1210, 1220, 1230, respectively. In some other embodiments, the light distributing elements 1214, 1224, 1234, may be disposed on both top and bottom major surface of associated waveguides 1210, 1220, 1230, respectively; or the light distributing elements 1214, 1224, 1234, may be disposed on different ones of the top and bottom major surfaces in different associated waveguides 1210, 1220, 1230, respectively.

The waveguides 1210, 1220, 1230 may be spaced apart and separated by gas and/or solid layers of material. For example, as illustrated, layers 1216a and 1218a may separate waveguides 1210 and 1220; and layers 1216b and 1218b may separate waveguides 1220 and 1230. In some embodiments, the layers 1216a and 1216b are formed of materials that are indexed matched with the materials forming the immediately adjacent one of waveguides 1210, 1220, 1230. Advantageously, the indexed matched layers 1216a and 1216b may facilitate the propagation of light through the thickness of the set 1200 of waveguides, such that light can travel, e.g., through the waveguides 1210, 1220 and 1230 to the incoupling optical element 1232 with little reflection or loss.

In some embodiments, the layers 1216b and 1218b are formed of low refractive index materials (that is, materials having a lower refractive index than the material forming the immediately adjacent one of waveguides 1210, 1220, 1230). Preferably, the refractive index of the material forming the layers 1216b, 1218b is 0.05 or more, or 0.10 or more less than the refractive index of the material forming the waveguides 1210, 1220, 1230. Advantageously, the lower refractive index layers 1216b, 1218b may function as cladding layers that facilitate total internal reflection (TIR) of light through the waveguides 1210, 1220, 1230 (e.g., TIR between the top and bottom major surfaces of each waveguide). In some embodiments, the layers 1216b, 1218b are formed of air. While not illustrated, it will be appreciated that the top and bottom of the illustrated set 1200 of waveguides may include immediately neighboring cladding layers.

Preferably, for ease of manufacturing and other considerations, the material forming the waveguides 1210, 1220, 1230 are similar or the same, and the material forming the layers 1216b, 1218b are similar or the same. In some embodiments, the material forming the waveguides 1210, 1220, 1230 may be different between one or more waveguides, and/or the material forming the layers 1216b, 1218b may be different, while still holding to the various refractive index relationships noted above.

With continued reference to FIG. 11A, light rays 1240, 1242, 1244 are incident on the set 1200 of waveguides. It will be appreciated that the set 1200 of waveguides may be part of the stack of waveguides in the display system 1000 (FIG. 6). For example, the waveguides 1210, 1220, 1230 may correspond to three of the waveguides 182, 184, 186, 188, 190, and the light rays 1240, 1242, 1244 may be injected into the waveguides 1210, 1220, 1230 by one or more image injection devices 200, 202, 204, 206, 208.

Preferably, the light rays 1240, 1242, 1244 have different properties, e.g., different wavelengths or ranges of wavelengths, which may correspond to different colors. The incoupling optical elements 1212, 122, 1232 selectively deflect the light rays 1240, 1242, 1244 based upon a particular feature of the property of light, while transmitting light that does not having that property or features. In some embodiments, the property of light is wavelength and the incoupling optical elements 1212, 122, 1232 each selectively deflect one or more particular wavelengths of light, while transmitting other wavelengths to an underlying waveguide and associated incoupling optical element.

For example, incoupling optical element 1212 may be configured to selectively deflect (e.g., reflect) ray 1240, which has a first wavelength or range of wavelengths, while transmitting rays 1242 and 1244, which have different second and third wavelengths or ranges of wavelengths, respectively. The transmitted ray 1242 then impinges on and is deflected by the incoupling optical element 1222, which is configured to selectively deflect (e.g., reflect) light of second wavelength or range of wavelengths. The ray 1244 is transmitted by the incoupling optical element 1222 and continues on to impinge on and be deflected by the incoupling optical element 1232, which is configured to selectively deflect (e.g., reflect) light of third wavelength or range of wavelengths. In some embodiments, the incoupling optical elements 1212, 1222, 1232 are reflective color filters, such as dichroic filters.

With continued reference to FIG. 11A, the deflected light rays 1240, 1242, 1244 are deflected so that they propagate through a corresponding waveguide 1210, 1220, 1230; that is, the incoupling optical elements 1212, 1222, 1232 of each waveguide deflects light into that corresponding waveguide 1210, 1220, 1230 to incouple light into that corresponding waveguide. The light rays 1240, 1242, 1244 are deflected at angles that cause the light to propagate through the respective waveguide 1210, 1220, 1230 by TIR.

In some embodiments, to cause the light rays 1240, 1242, 1244 to impinge on the incoupling optical elements 1212, 1222, 1232 at the appropriate angles for TIR, an angle-modifying optical element 1260 may be provided to alter the angle at which the light rays 1240, 1242, 1244 strike the incoupling optical elements. For example, in some embodiments, the light rays 1240, 1242, 1244 may be incident on the angle-modifying optical element 1260 at an angle normal to the waveguide 1210. The angle-modifying optical element 1260 then changes the direction of propagation of the light rays 1240, 1242, 1244 so that they strike the incoupling optical elements 1212, 1222, 1232 at an angle of less than 90 degrees relative to the surface of waveguide 1210. In some embodiments, the angle-modifying optical element 1260 is a grating. In some other embodiments, the angle-modifying optical element 1260 is a prism.

With continued reference to FIG. 11A, the light rays 1240, 1242, 1244 propagate through the respective waveguide 1210, 1220, 1230 by TIR until impinging on the waveguide's corresponding light distributing elements 1214, 1224, 1234.

Figure 11B:
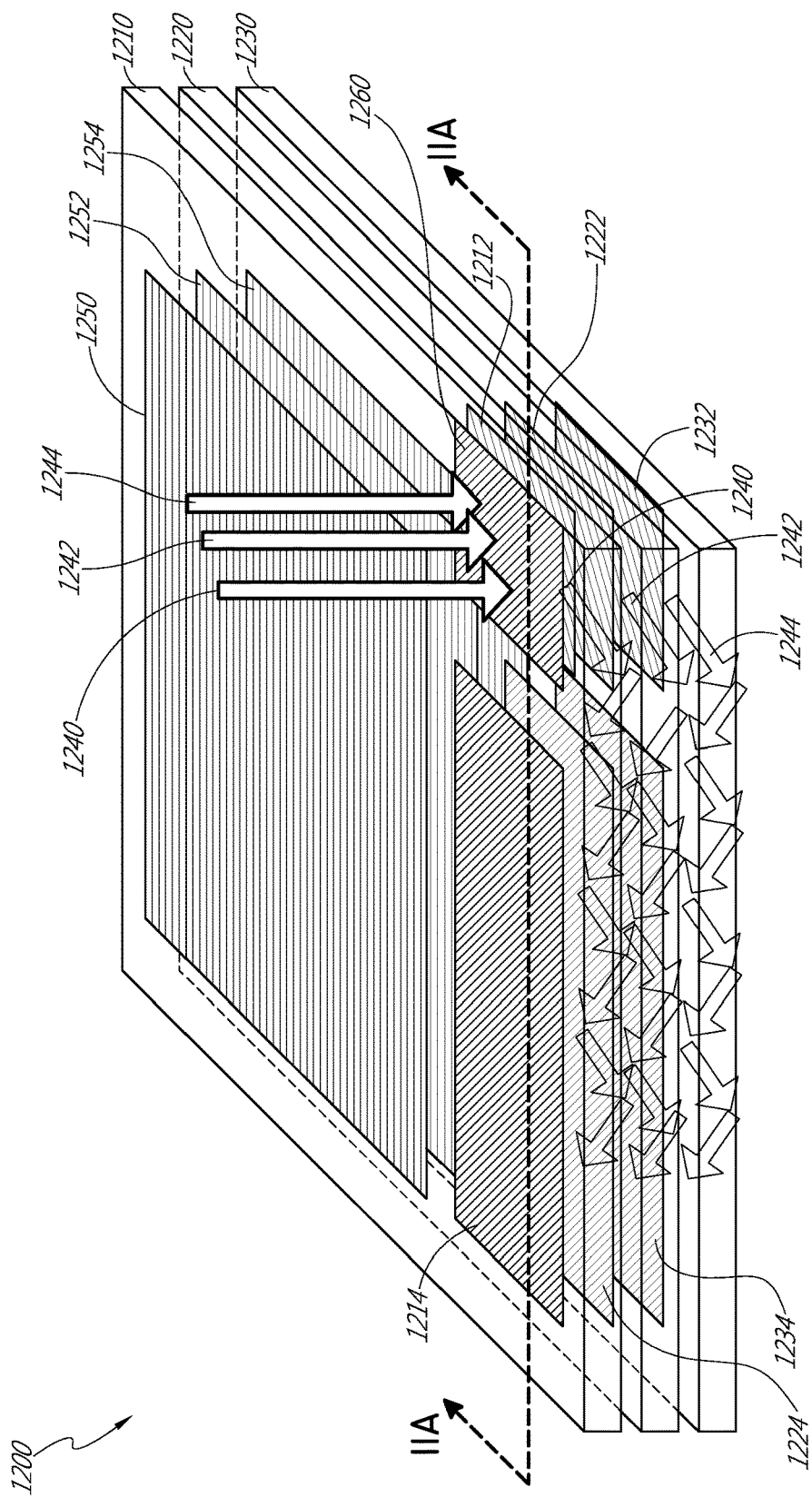
FIG. 11B illustrates an example of a perspective view of the plurality of stacked waveguides of FIG. 11A.

With reference now to FIG. 11B, an example of a perspective view of the plurality of stacked waveguides of FIG. 11A is illustrated. As noted above, the incoupled light rays 1240, 1242, 1244, are deflected by the incoupling optical elements 1212, 1222, 1232, respectively, and then propagate by TIR within the waveguides 1210, 1220, 1230, respectively. The light rays 1240, 1242, 1244 then impinge on the light distributing elements 1214, 1224, 1234, respectively. The light distributing elements 1214, 1224, 1234 deflect the light rays 1240, 1242, 1244 so that they propagate towards the outcoupling optical elements 1250, 1252, 1254, respectively.

In some embodiments, the light distributing elements 1214, 1224, 1234 are orthogonal pupil expanders (OPE's). In some embodiments, the OPE's both deflect or distribute light to the outcoupling optical elements 1250, 1252, 1254 and also increase the beam or spot size of this light as it propagates to the outcoupling optical elements. In some embodiments, e.g., where the beam size is already of a desired size, the light distributing elements 1214, 1224, 1234 may be omitted and the incoupling optical elements 1212, 1222, 1232 may be configured to deflect light directly to the outcoupling optical elements 1250, 1252, 1254. For example, with reference to FIG. 11A, the light distributing elements 1214, 1224, 1234 may be replaced with outcoupling optical elements 1250, 1252, 1254, respectively, in some embodiments.

As disclosed herein, it will be appreciated that the outcoupling optical elements 1250, 1252, 1254 may include diffractive structures, such as, for example, one or more of analog surface relief grating (ASR), Binary surface relief structures (BSR), Volume Holographic Optical Elements (VHOE), Digital Surface Relief structures and/or volume phase holograms, or a switchable diffractive optical element (e.g., Polymer Dispersed Liquid Crystal (PDLC) grating). In some embodiments, it will be appreciated that the outcoupling optical elements 1250, 1252, 1254 may be three of the outcoupling optical elements 282, 284, 286, 288, 290 of FIG. 6. In some embodiments, the outcoupling optical elements 1250, 1252, 1254 are exit pupils (EP's) or exit pupil expanders (EPE's) that direct light in a viewer's eye 4 (FIG. 7).

Accordingly, with reference to FIGS. 11A and 11B, in some embodiments, the set 1200 of waveguides includes a separate waveguide 1210, 1220, 1230; light distributing elements (e.g., OPE's) 1214, 1224, 1234; and outcoupling optical elements (e.g., EP's) 1250, 1252, 1254 for each component color. The three waveguide 1210, 1220, 1230 may be stacked with an air gap between each one, except where incoupling optical elements (e.g., color filters) 1212, 1222, 1232 are located. The color filters reflect the desired color into its appropriate waveguide, while transmitting light of other colors. For example, light is initially coupled into the first waveguide 1210 by an angle-modifying optical element 1260, such as an in-coupling grating or a prism. The light is then propagating at an angle which will result in TIR if the surface it encounters has a relative low refractive index material (e.g., air) on the other side of the surface, or it will reflect almost entirely if it hits an incoupling optical element (e.g., color filter) 1212, 1222, 1232, such as a properly designed dichroic filter when the light has the proper wavelength. In the example shown, light ray 1242 (e.g., green light) will reflect from the first incoupling optical element (e.g., color filter) 1212, and then continue to bounce down the waveguide, interacting with the light distributing element (e.g., OPE's) 1214 and then the outcoupling optical element (e.g., EPs) 1250, in a manner described earlier. The light rays 1242 and 1244 (e.g., blue and red light) will pass through the incoupling optical element (e.g., color filter) 1212 and into the next waveguide 1220. Light ray 1242 will reflect from the next incoupling optical element (e.g., color filter) 1222 and then bounce down the waveguide 1220 via TIR, proceeding on to its light distributing element (e.g., OPEs) 1224 and then the outcoupling optical element (e.g., EP's) 1252. Finally, light rays 1244 (e.g., red light) will pass through the incoupling optical element (e.g., color filter) 1232 and into its waveguide 1230, where it propagates to its light distributing element (e.g., OPEs) 1234 and then the outcoupling optical element (e.g., EPs) 1254, finally coupling out to the viewer, along with the light from the other waveguides 1210, 1220.

Figure 12A:
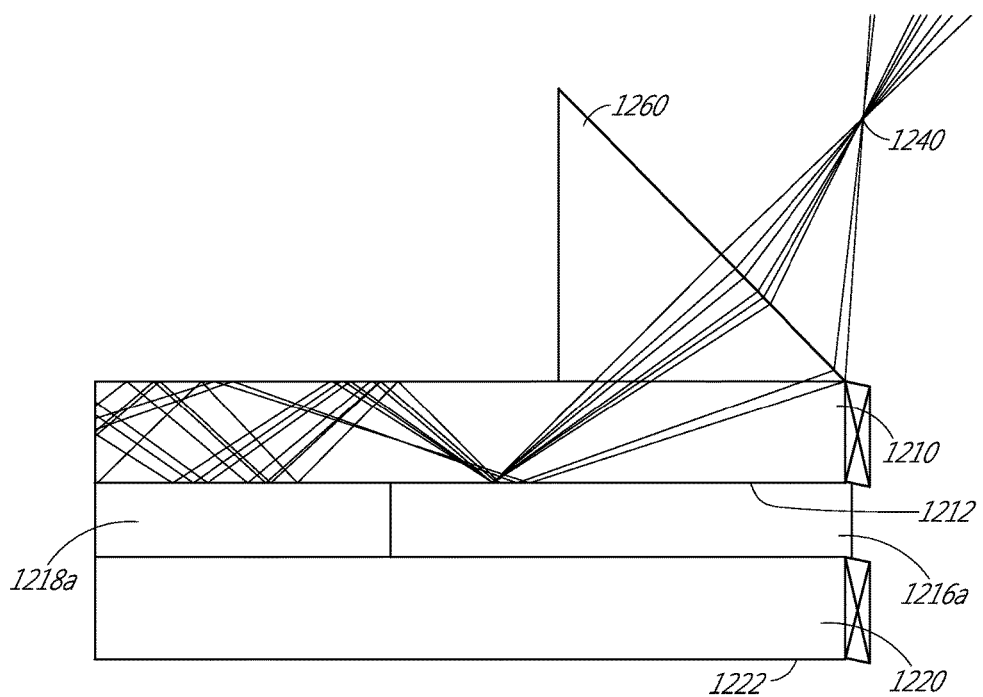
FIGS. 12A-12B illustrate examples of cross-sectional side views of a waveguide with an angle-modifying optical element to facilitate the incoupling of light into the waveguide.
Figure 12B:
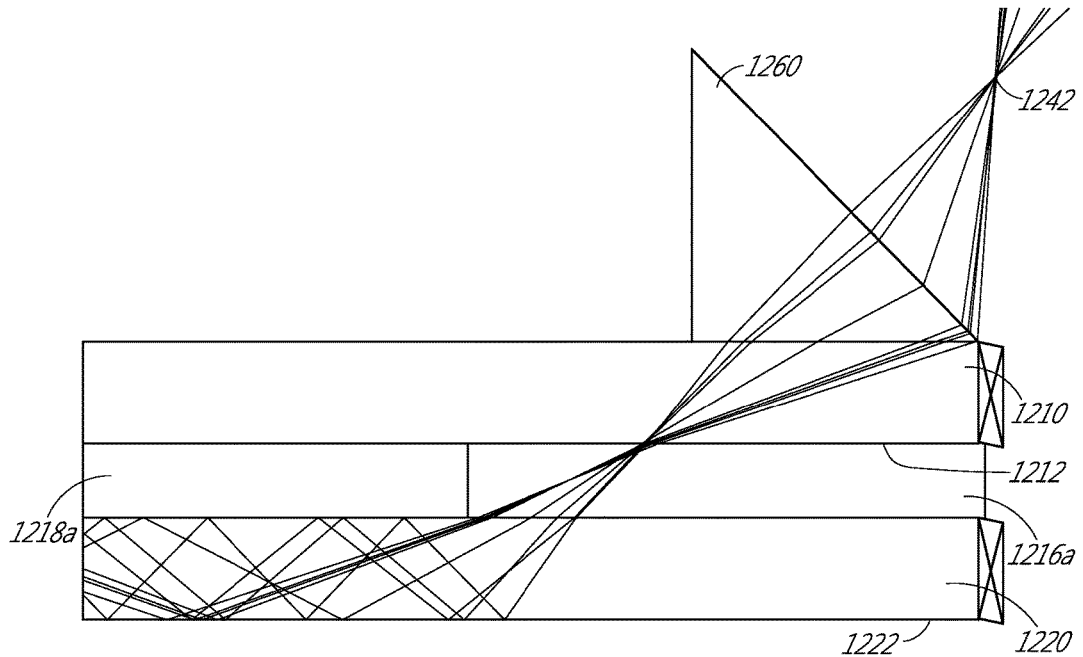

With reference now to FIGS. 12A-12B, examples of cross-sectional side views of a waveguide with an angle-modifying optical element 1260 to facilitate the incoupling of light into the waveguide are shown. As noted herein, the angle-modifying optical element 1260 may include gratings that may, e.g., deflect light rays by diffraction. In some other embodiments, the angle-modifying optical element 1260 may be a prism, which may alter the direction or angle of propagation of light rays, e.g., by refraction. FIG. 12A shows a wavelength band of light being incoupled through the prism 1260 and reflected from the incoupling optical element (e.g., color filter) 1212 and propagated by TIR within the first waveguide 1210. FIG. 12B shows a second wavelength band of light being transmitted though the incoupling optical element (e.g., color filter) 1212 and being reflected from the incoupling optical element (e.g., color filter) 1222 and propagated by TIR within the second waveguide 1220.

Figure 13:
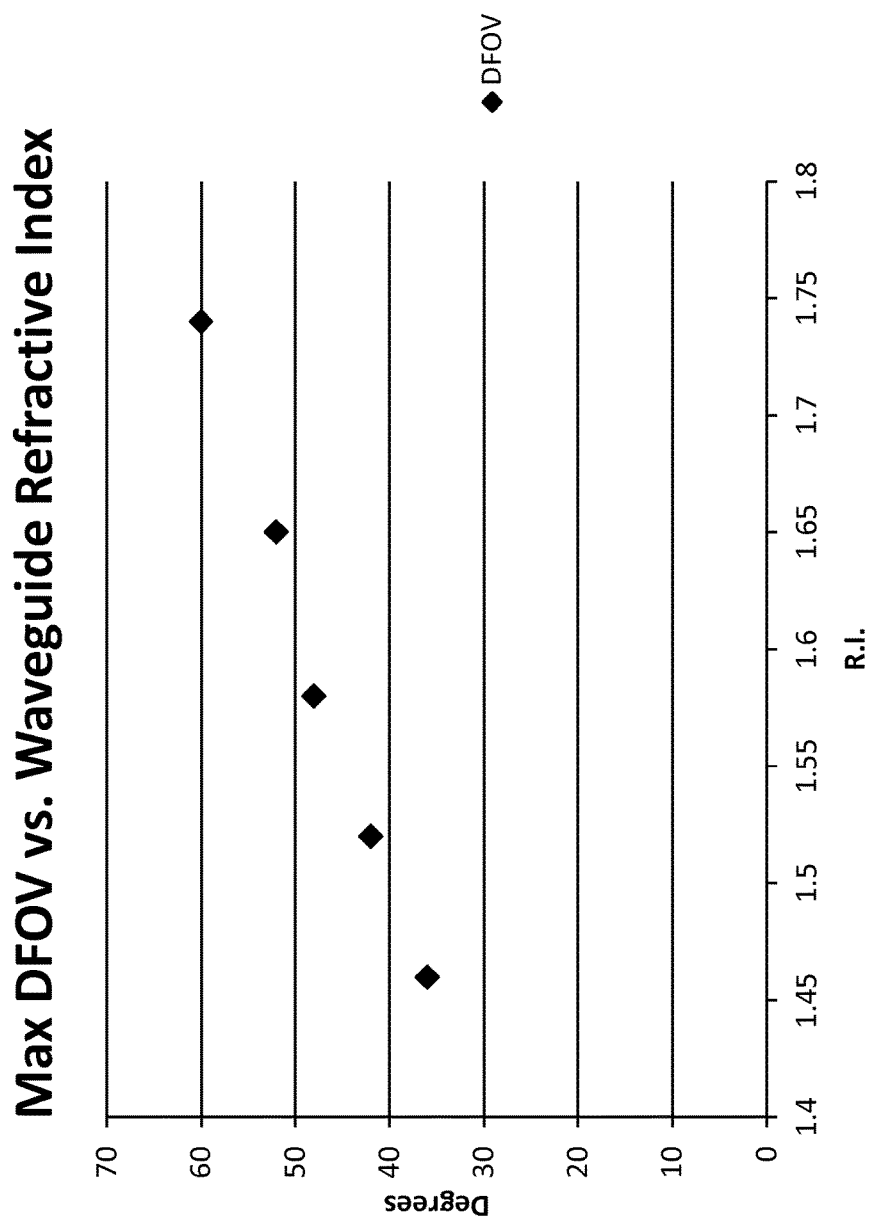
FIG. 13 is a plot showing the expected impact of refractive index on field of view.

It has been found that the various waveguides (e.g., 905, FIGS. 9A-10B; and 1210, 1220, 1230, FIGS. 11A-11B) will benefit from being made using materials having a high index of refraction. FIG. 13 is a plot showing the expected impact of refractive index on field of view. FIG. 13 illustrates simulation results from a single color eyepiece for the display 62, the eyepiece being significantly similar to one of the waveguides 1210, 1220, 1230 of FIGS. 11A-11B. In the simulation, the index of refraction of the waveguide was varied up to values associated with various resins (at the high end), down to a value representing fused silica (at the low end). A clear increase in usable field of view was found and is shown in the graph. For this reason, in some embodiments, the various waveguides disclosed herein may be formed of material providing a high refractive index waveguide.

In some embodiments, the various waveguides disclosed herein (e.g., the waveguide 905, FIGS. 9A-10C; and waveguides 1210, 1220, 1230, FIGS. 11A-11B) may be formed of glass, polymer, plastic, sapphire, resins, or other materials that are transmissive to wavelengths in the visible spectrum. As disclosed herein, waveguides comprising material with relatively high refractive index can have a higher usable field of view (FoV). For example, the usable FoV can increase from about 35 degrees to about 60 degrees when the refractive index of the material of the waveguide increases from about 1.45 to about 1.75. Accordingly, various embodiments described herein may include waveguides comprising material with a refractive index greater than 1.5, between about 1.5 and 1.8, greater than 1.6, or greater than 1.8.

In some embodiments, it will be appreciated that the waveguides with diffractive structures (e.g., gratings) on the waveguides may be made, e.g., by injection compression molding, UV replication, or nano-imprinting of the diffractive structures on top of a high index substrate. In some embodiments, such methods may be used to form either ASR structure based designs or binary surface relief designs.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

While illustrated as an eyewear in a wearable system as an advantageous example, the waveguides and related structures and modules disclosed herein may be applied to form a non-wearable display. For example, rather than being accommodated in a wearable frame 64 (FIG. 2), the display 62 may be attached to a stand, mount, or other structure that supports the display 62 and allows the display 62 to provide images to a viewer 60 without being worn by the viewer 60 (e.g., as a desk or table-top monitor).

In some embodiments, various features described herein with reference to certain figures may be utilized in embodiments discussed with reference to other figures. For example, with reference to FIG. 9B, a color filter such as the color filters 1013a, 1013b of FIGS. 10B&10C, may be provided between the outcoupling optical elements 909a, 909b, respectively, and the waveguide 905. Similarly, with reference to FIG. 11A, a color filter similar to the colors filters 1013a, 1013b of FIGS. 10B&10C, may be provided between the outcoupling optical elements 1214, 1224, 1234 and their respectively waveguide 1210, 1220, 1230. It will be appreciated, that for each outcoupling optical element, the color filter separating that element from its corresponding waveguide is configured to transmit the wavelength or wavelengths of light that the outcoupling optical element is configured to outcouple, while reflecting other wavelengths of light.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity)

may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A display system comprising:
   a display comprising a waveguide stack comprising a plurality waveguides, each waveguide comprising a first major surface and a second major surface, wherein the waveguide stack comprises:
   a first waveguide;
   a first wavelength selective filter proximate to and on the first major surface of the first waveguide;
   a first outcoupling optical element comprising diffractive elements proximate to and on the first wavelength selective filter;
   a second waveguide over the first outcoupling optical element;
   a second wavelength selective filter proximate to and on the first major surface of the second waveguide;
   a second outcoupling optical element comprising diffractive elements proximate to and on the second wavelength selective filter of the second waveguide;
   a first incoupling optical element configured to incouple incident light into the first waveguide; and
   a second incoupling optical element configured to incouple incident light into the second waveguide;
   wherein the first wavelength selective filter has a first rearward surface adjacent the first major surface and a first forward surface opposite the first rearward surface, the first wavelength selective filter configured to:
   transmit incoupled light at a first plurality of wavelengths through the first rearward surface and reflect a portion of the transmitted light at the first plurality of wavelengths away from the first forward surface; and
   wherein the first outcoupling optical element is configured to outcouple the incoupled light of the first plurality of wavelengths transmitted through the first wavelength selective filter.

2. The display system of claim 1, wherein the first waveguide further comprises:
   an additional wavelength selective filter on the second major surface, the additional wavelength selective filter having a second rearward surface adjacent the second major surface and a second forward surface opposite the second rearward surface, the additional wavelength selective filter configured to:
   transmit incoupled light at second wavelengths different from the first plurality of wavelengths through the second rearward surface and reflect a portion of the transmitted light at the second wavelengths from the second forward surface; and
   an additional outcoupling optical element comprising diffractive elements disposed on the additional wavelength selective filter, the additional outcoupling optical element configured to outcouple the incoupled light at the second wavelengths transmitted through the additional wavelength selective filter.

3. The display system of claim 1, wherein each waveguide has an associated depth plane, wherein each waveguide is configured to produce an image appearing to originate from that waveguide's associated depth plane.

4. The display system of claim 1, wherein different waveguides of the waveguide stack have different associated depth planes.

5. The display system of claim 4, wherein the outcoupling optical elements for different depth planes have different optical power so as to provide different divergence of exiting light for each depth plane.

6. The display system of claim 2, wherein each waveguide further comprises a light redistributing element configured to:
   receive a portion of light at the first plurality of wavelengths and the second wavelengths transmitted through the first and the additional wavelength selective filters; and
   distribute the light of the first plurality of wavelengths and the second wavelengths to the first and additional outcoupling optical elements.

7. The display system of claim 2, wherein the first and the additional wavelength selective filters comprise dichroic filters.

8. The display system of claim 2, wherein the first and the additional wavelength selective filters are configured to transmit light of the first plurality of wavelengths and the second wavelengths incident at angles between 0 degrees and 20 degrees with respect to a normal to the corresponding first or the second major surface of the first waveguide.

9. The display system of claim 2, further comprising:
   light distributing elements configured to:
   receive incoupled light of the first plurality of wavelengths and the second wavelengths from the first incoupling optical element; and
   distribute the light of the first plurality of wavelengths and the second wavelengths to the first and additional outcoupling optical elements.

10. The display system of claim 9, wherein the light distributing elements comprise one or more diffractive optical elements.

11. The display system of claim 9, wherein the light distributing elements are orthogonal pupil expanders.

12. The display system of claim 2, wherein the additional wavelength selective filter is configured to transmit incoupled light at the second wavelengths and reflect incoupled light at wavelengths other than the wavelengths.

13. The display system of claim 1, wherein the first outcoupling optical element comprises a surface relief grating, a hologram, or a switchable diffractive optical element.

14. The display system of claim 13, wherein the switchable diffractive optical element comprises a switchable Polymer Dispersed Liquid Crystal (PDLC) grating.

15. The display system of claim 13, wherein the surface relief grating comprises one or more of an analog surface relief grating (ASR) or a binary surface relief structure (BSR).

16. The display system of claim 13, wherein the one or more gratings of the additional outcoupling optical element comprises one or more of a surface relief grating, a hologram, or a switchable diffractive optical element.

17. The display system of claim 16, wherein the switchable diffractive optical element comprises a switchable Polymer Dispersed Liquid Crystal (PDLC) grating.

18. The display system of claim 1, wherein the incoupling optical element includes one or more diffractive optical elements.

19. The display system of claim 18, wherein the one or more diffractive optical elements comprises a surface relief grating or a hologram.

20. The display system of claim 19, wherein the surface relief grating comprises one or more of an analog surface relief grating (ASR) or a binary surface relief structure (BSR).

21. The display system of claim 18, wherein the one or more diffractive optical elements comprises a switchable diffractive optical element, the switchable diffractive optical element being a switchable Polymer Dispersed Liquid Crystal (PDLC) grating.

22. The display system of claim 1, wherein the first wavelength selective filter is configured to transmit incoupled light at a first plurality of wavelengths and reflect incoupled light at wavelengths other than the first plurality of wavelengths.

* * * * *